US009228716B2

(12) United States Patent
Davis et al.

(10) Patent No.: US 9,228,716 B2
(45) Date of Patent: Jan. 5, 2016

(54) REFLECTIVE NANOFIBER LIGHTING DEVICES

(75) Inventors: James Lynn Davis, Holly Springs, NC (US); Kimberly A. Guzan, Clayton, NC (US); Karmann C. Mills, Apex, NC (US); Michael K. Lamvik, Durham, NC (US); James F. Bittle, Raleigh, NC (US); Laura Haines, Durham, NC (US)

(73) Assignee: RESEARCH TRIANGLE INSTITUTE, Research Triangle Park, NC (US)

( * ) Notice: Subject to any disclaimer, the term of this patent is extended or adjusted under 35 U.S.C. 154(b) by 90 days.

(21) Appl. No.: 14/123,248

(22) PCT Filed: Jun. 1, 2012

(86) PCT No.: PCT/US2012/040335
§ 371 (c)(1),
(2), (4) Date: Dec. 2, 2013

(87) PCT Pub. No.: WO2012/167001
PCT Pub. Date: Dec. 6, 2012

(65) Prior Publication Data
US 2014/0119026 A1 May 1, 2014

Related U.S. Application Data

(60) Provisional application No. 61/492,563, filed on Jun. 2, 2011.

(51) Int. Cl.
*F21V 7/00* (2006.01)
*F21V 7/22* (2006.01)
(Continued)

(52) U.S. Cl.
CPC ... *F21V 7/22* (2013.01); *F21K 9/50* (2013.01); *F21K 9/56* (2013.01); *F21V 7/0008* (2013.01); *F21V 9/16* (2013.01); *D06M 11/00* (2013.01); *D06M 13/00* (2013.01); *D06M 15/00* (2013.01); *F21Y 2101/02* (2013.01)

(58) Field of Classification Search
CPC ......... F21V 7/22; D06M 13/00; D06M 11/00; B82Y 20/00; B82Y 30/00
USPC ...................................................... 362/296.02
See application file for complete search history.

(56) References Cited

U.S. PATENT DOCUMENTS 6,015,610 A 1/2000 Minor et al.
2005/0205878 A1 9/2005 Kan
(Continued)

OTHER PUBLICATIONS

U.S. Appl. No. 14/103,110, filed Dec. 11, 2013, Davis et al.
(Continued)

*Primary Examiner* — Evan Dzierzynski
(74) *Attorney, Agent, or Firm* — Oblon, McClelland, Maier & Neustadt, L.L.P.

(57) ABSTRACT

A fiber-based reflective lighting device and a housed lighting device. The fiber-based reflective lighting device which includes a source configured to generate a primary light, and a substrate having a nanocomposite mat of reflective fibers having a diameter less than 1,000 nm which diffusively reflects light upon illumination with at least the primary light. The nanocomposite mat includes a reflectance-enhancing coating conformally disposed around an outer surface of the fibers, having a refractive index different from the reflective fibers, and which increases a reflectance of the substrate in the visible spectrum. The lighting device includes a light exit configured to emanate the reflected light. The housed lighting device includes a housing, a source configured to generate primary light and direct the primary light into the housing, the reflective nanocomposite mat of reflective fibers, and a light exit in the housing configured to emanate the reflected light from the housing.

33 Claims, 13 Drawing Sheets

(51) Int. Cl.

| | |
|---|---|
| ***F21K 99/00*** | (2010.01) |
| ***F21V 9/16*** | (2006.01) |
| *D06M 11/00* | (2006.01) |
| *D06M 13/00* | (2006.01) |
| *D06M 15/00* | (2006.01) |
| *F21Y 101/02* | (2006.01) |

(56) References Cited

U.S. PATENT DOCUMENTS

| | | | | |
|---|---|---|---|---|
| 2008/0113214 | A1 | 5/2008 | Davis et al. | |
| 2009/0218537 | A1* | 9/2009 | Soroushian et al. | 252/62.2 |
| 2010/0009165 | A1* | 1/2010 | Patel et al. | 428/323 |
| 2010/0177306 | A1* | 7/2010 | Natan | B82Y 30/00 356/301 |
| 2010/0177518 | A1 | 7/2010 | Walls et al. | |
| 2010/0209602 | A1 | 8/2010 | Davis et al. | |
| 2012/0281428 | A1 | 11/2012 | Davis et al. | |
| 2013/0308334 | A1 | 11/2013 | Davis et al. | |

OTHER PUBLICATIONS

International Search Report Issued Aug. 21, 2012 in PCT/US12/40335 Filed Jun. 1, 2012.

* cited by examiner

FIGURE 3

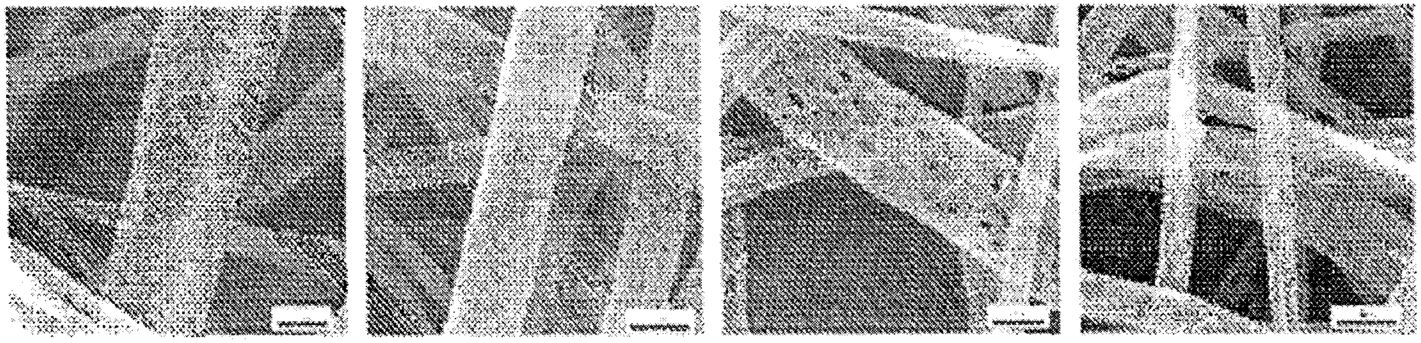

(a) (b) (c) (d)

Scanning Electron Microscopy (SEM) Images of porous PMMA nanofibers. Electrospinning conditions: +20KV, 1.0ml/Hr, collector grounded. Concentration of the solvents for the samples: (a) 98% toluene, 2% *N*-methylformamide; (b) 95% toluene, 5% *N*-methylformamide; (c) 90% toluene, 10% *N*-methylformamide; (d) 80% toluene, 20% *N*-methylformamide. The scale marker is a 1 micron bar for (a), (b), (c). The scale marker is a 2 micron bar for (d).

Scanning Electron Microscopy (SEM) Images of porous PMMA nanofibers. Electrospinning conditions: +20KV, 1.0ml/Hr, collector grounded. Concentration of the solvents for the samples: (a) 98% toluene, 2% N-methylformamide;

REFLECTIVE NANOFIBER LIGHTING DEVICES

CROSS REFERENCE TO RELATED APPLICATIONS

This application claims priority to U.S. Ser. No. 61/492,563 filed Jun. 2, 2011 the entire contents of which are incorporated herein by reference. This application is related to U.S. Application Ser. No. 61/266,323 filed Dec. 3, 2009, the entire contents of which are incorporated herein by reference. This application is related to U.S. application Ser. No. 10/819,916, filed on Apr. 8, 2004, entitled "Electrospinning of Polymer Nanofibers Using a Rotating Spray Head," the entire contents of which are incorporated herein by reference. This application is also related to U.S. application Ser. No. 10/819,942, filed on Apr. 8, 2004, entitled "Electrospray/electrospinning Apparatus and Method," the entire contents of which are incorporated herein by reference. This application is related to U.S. application Ser. No. 10/819,945, filed Apr. 8, 2004, entitled "Electrospinning in a Controlled Gaseous Environment," the entire contents of which are incorporated herein by reference. This application is related to U.S. Ser. No. 11/130,269, filed May 17, 2005 entitled "Nanofiber Mats and Production Methods Thereof," the entire contents of which are incorporated herein by reference. This application is related to U.S. application Ser. No. 11/559,260, filed on Nov. 13, 2006, entitled "LUMINESCENT DEVICE," the entire contents of which are incorporated herein by reference. This application is related to U.S. Ser. No. 60/929,077, filed Jun. 12, 2007 entitled "Long-Pass Optical Filter Made from Nanofibers," the entire contents of which are incorporated herein by reference. This application is related to PCT/US2008/066620, filed Jun. 12, 2008 entitled "Long-Pass Optical Filter Made from Nanofibers," the entire contents of which are incorporated herein by reference. This application is related to PCT/US2009/043784, filed May 13, 2008 entitled "POROUS AND NON-POROUS NANOSTRUCTURES AND APPLICATION THEREOF,". This application is related to U.S. Application Ser. No. 61/169,468, filed on Apr. 15, 2009, entitled "STIMULATED LIGHTING DEVICE," the entire contents of which are incorporated herein by reference.

This application is related to International PCT Application No. PCT/US2010/057007, the entire contents of which are incorporated herein by reference. This application is related to U.S. application Ser. No. 12/992,112, the entire contents of which are incorporated herein by reference.

BACKGROUND OF THE INVENTION

1. Field of the Invention

This invention is related to device and apparatus and methods for producing white light from luminescent particle excitation and emission.

2. Description of the Related Art

The choice of general illumination sources for commercial and residential lighting is generally governed by a balance of energy efficiency and the ability to faithfully produce colors as measured by the color rendering index (CRI). Existing fluorescent lighting is known to be economical from an energy consumption point of view. However, many users complain that the light produced by the existing fluorescent lighting is of poor spectral quality and produces eye strain and other adverse health effects. Incandescent light is also widely used and is recognized as having excellent spectral quality and the ability to accurately render colors. This high spectral quality is derived from the hot filament, which serves as a blackbody radiator and emits light over many wavelengths, similar to the sun. However, incandescent lighting suffers from very low energy efficiency. Thus, there is a long felt need to produce light sources that use less energy and have a light composition similar to the composition of the sun light.

Solid-state lighting (SSL) is an alternative general illumination and lighting technology that promises the energy efficiency of fluorescent lights and the excellent spectral qualities of incandescent lighting. Typically, commercially available SSL lamps consists of a light emitting diode (LED) surrounded by a phosphor composed of large particles usually larger than 2 μm. The light emitted from the LED is of sufficient energy to cause the phosphor to fluoresce and emit one or more colors of visible light. The most common example of commercial SSL products consists of a blue LED (typically 460 nm) surrounded by a yellow phosphor, such as cerium-doped yttrium aluminum garnet (YAG:Ce), that emits lights in a broad band centered at 550 nm. The combination of nominally yellow light emission from the phosphor and blue light from the LED produces a light source that has a generally white appearance. Alternatively, an LED that emits in the ultraviolet (<400 nm) can be used to excite a blend of red, green, and blue phosphors.

In addition, while the light intensity from lamps used in current solid-state lighting products is sufficient for applications such as flashlights, it is considered too low and the emission cone is considered too narrow for use in general illumination applications such as room lighting. Hence, there is a need for solid-state light sources that are capable of providing high intensity white light emissions over a large enough area for use in general illumination.

One approach proposed to improve the performance of SSL devices has been to use nanoparticles such as quantum dots as secondary converters to produce white light. "Quantum Dots Lend New Approach to Solid-State Lighting," Sandia National Laboratory press release Jul. 24, 2003. This approach incorporates quantum dots into a polymer used to encapsulate the light emitting diode (LED) and essentially creates a three-dimensional dome of quantum dots around the LED die. While this method has been successful in producing white light, the three-dimensional dome structure places large quantities of quantum dots in non-optimal positions around the LED and creates potential quantum dot agglomeration issues.

Previously, polymer/quantum dot compound nanofibers have been obtained from electrospinning of the polymer/quantum dot composite solutions, as disclosed in Schlecht et. al., Chem. Mater. 2005, 17, 809-814. However, the nanofibers produced by Schlecht et al. were on the order of 10-20 nm in diameter, in order to produce quantum confinement effects. The size range of the nanoparticles and nanofibers disclosed therein is not advantageous for conversion of a primary light into secondary light emission across the white light spectrum.

Lu. et. al., Nanotechnology, 2005, 16, 2233, also reported the making of $Ag_2S$ nanoparticles embedded in polymer fiber matrices by electrospinning. Once again, the size range of the nanoparticles and nanofibers shown therein is not advantageous for conversion of a primary light into secondary light emission across the white light spectrum.

As described in U.S. application Ser. No. 11/559,260, filed on Nov. 13, 2006, entitled "LUMINESCENT DEVICE," referenced above, highly-efficient, light-producing sheets have been developed based on a combination of photoluminescent particles and polymer nanofibers. These luminescent sheets can be used in a white-light solid-state lighting device in which the sheets are illuminated by a blue light-emitting diode (LED) light source and the sheets will transform the incident blue light into, for example, yellow light. An appropriate mixture of yellow and blue light will produce the appearance of white light.

One particular advantage of these light-producing sheets is that photoluminescent particles are suspended in air on the nanofibers instead of being contained in a bulk material with a relatively high index of refraction. This arrangement prevents light from being trapped by total internal reflection, as occurs when the particles are encapsulated within bulk materials.

Other work (listed below and incorporated herein in their entirety by reference) has studied nanofibers in optical configurations where the unique nano-scale optical properties of the nanofibers were observed.

1. P. Vukusic, B. Hallam, and J. Noyes, Science 315, 348 (2007);

2. J. L. Davis, A. L. Andrady, D. S. Ensor, L. Han, H. J. Walls, U.S. Patent Application U.S. 20080113214 (submitted November 2006); H. J. Walls, J. L. Davis, and D. S. Ensor, PCT Patent Application WO2009/032378 (submitted June 2007); and J. L. Davis, H. J. Walls, L. Han, T. A. Walker, L A. Tufts, A. Andrady, D. S. Ensor, in *Seventh International Conference on Solid State Lighting*, edited by I. T. Ferguson, N. Narendan, T. Taguchi, and I. E. Ashdown, (SP1E Proceedings 6669) pp. 666916-1-666916-9;

3. J. Yip. S.-P. Ng, and K.-H. Wong, *Textile Research Journal* 79, 771 (2009);

4. U.S. Pat. No. 5,892,621 Light reflectant surface for luminaires;

5. U.S. Pat. No. 6,015,510 Very thin highly light reflectant surface and method for making and using same;

6. U.S. Pat. No. 7,660,040 Diffuse reflective article;

7. U.S. Patent Application Publ. No. 2009/0137043 Methods for modification of polymers, fibers, and textile medium;

8. U.S. Patent Application Publ. No. 2010/0014164 Diffuse reflector, diffuse reflective article, optical display, and method for producing a diffuse reflector;

9. U.S. Patent Application Publ. No. 20100238665 Diffusive light reflectors with polymer coatings;

10. U.S. Patent Application Publ. No. 20100239844 Diffusive light reflective paint composition, method for making paint composition, and diffusely light reflecting articles.

SUMMARY OF THE INVENTION

In one embodiment of the invention, there is provided a fiber-based reflective lighting device which includes a source configured to generate a primary light, and a substrate having a nanocomposite mat of reflective fibers having diameters less than 1,000 nm, which diffusively reflects visible light upon illumination with at least the primary light. The nanocomposite mat including a reflectance-enhancing coating conformally disposed around an outer surface of the fibers, having a refractive index different from the reflective fibers, and which increases a reflectance of the substrate in the visible spectrum. The lighting device includes a light exit configured to emanate the reflected light.

In another embodiment of the invention, there is provided a lighting device which includes a housing, a source configured to generate primary light and direct the primary light into the housing, a substrate having a nanocomposite mat of reflective fibers having diameters less than 1,000 nm, which diffusively reflects visible light upon illumination with at least the primary light. The nanocomposite mat including a reflectance-enhancing coating conformally disposed around an outer surface of the fibers, having a refractive index different from the reflective fibers, and which increases a reflectance of the substrate in the visible spectrum. The lighting device includes a light exit in the housing configured to emanate the reflected light from the housing.

In another embodiment of the invention, there is provided a lighting device insert which includes a nanocomposite mat of reflective fibers having diameters less than 1,000 nm, which diffusively reflects visible light upon illumination with at least the primary light. The nanocomposite mat including a reflectance-enhancing coating having a refractive index different from the reflective fibers and which increases a reflectance of the substrate in the visible spectrum. The lighting device insert diffusively reflects at least 70% of incident light.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a micrograph of a mat of reflective fibers showing porous PMMA nanofibers made under different electrospinning conditions;

DETAILED DESCRIPTION OF THE EMBODIMENTS

Figure 1:
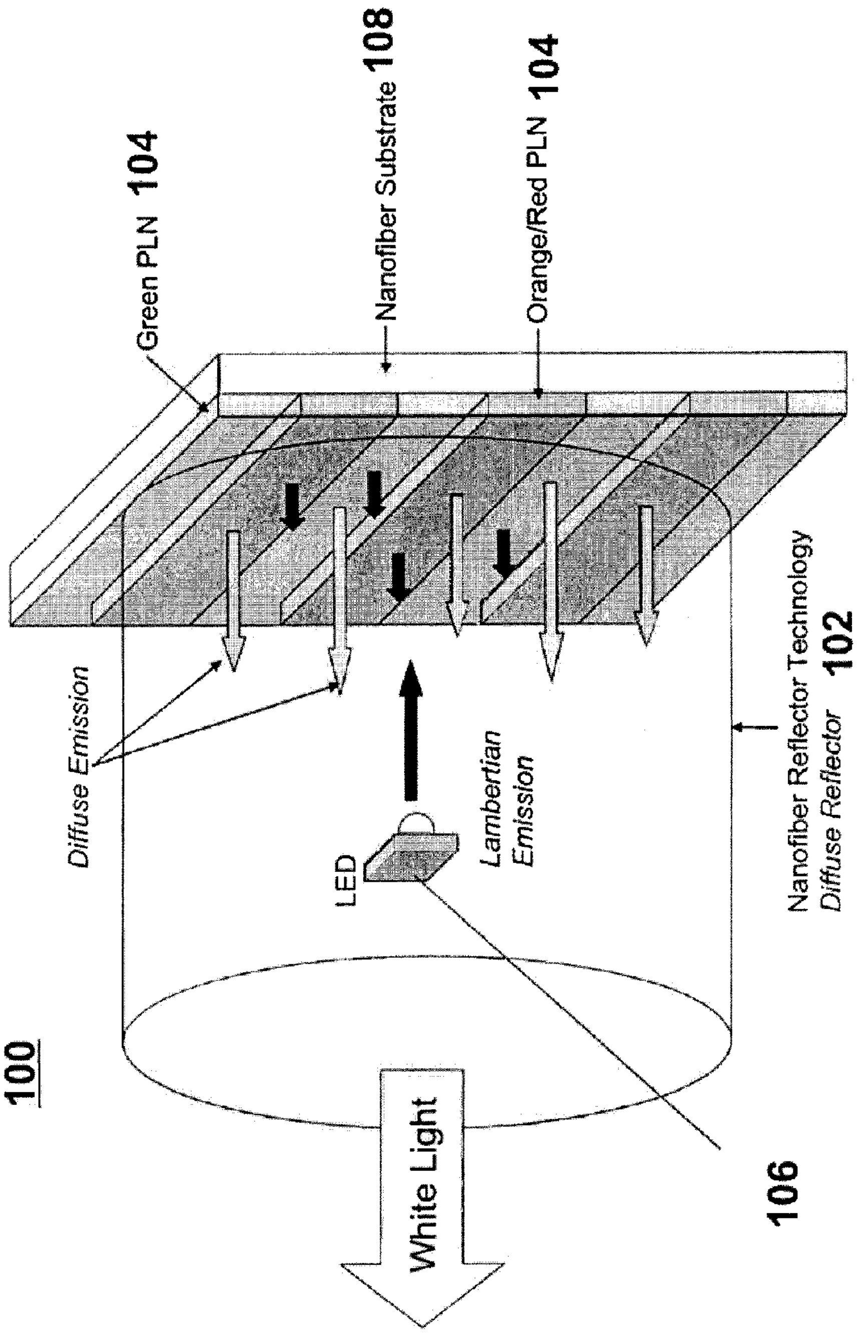
FIG. 1 is a schematic depicting a downlight device made using the reflective nanofiber and photoluminescent nanofibers.

Lighting devices for general illumination can be fabricated by combining a pump wavelength (e.g., blue emission in the 440-470 nm range; violet emission in the 380-440 nm range; or ultraviolet emission in the 330-380 nm range) with one or more photoluminescent materials that emit at wavelengths longer than the pump light. The photoluminescent material may be of multiple chemistries and particle sizes including phosphors, nanophosphors, and quantum dots. The luminescent material is often brittle and requires a binder or support matrix in order to be incorporated into practical devices.

In one embodiment of the invention, a lighting device includes luminescent particles combined with a polymeric material that provides mechanical strength and imparts desirable optical properties to the resulting photoluminescent layer. For example, it is desirable in some lighting applications to have a photoluminescent layer that includes a blend of light transmission and light reflection properties, which can be achieved through the judicious choice of materials for the composite. Alternatively, in some embodiments of the invention, it is desirable to have a photoluminescent layer that provides a high degree of light reflection. Alternatively, in some embodiments of the invention, it is desirable to have a fiber mat layer separate from the photoluminescent layer that provides a high degree of light reflection.

One way to control the transmission and reflection properties of either the photoluminescent layer or the fiber mat layer is by controlling the index of refraction of the layer relative to the surrounding media. For example, a photoluminescent layer that is index matched with its surrounding medium will display a large light transmission, while a material that is not exactly index matching will display a mixture of light transmission and light reflection. The extent of light reflection in such a media is determined by the difference in the index of refraction of the photoluminescence layer to the surrounding media through the Fresnel equations.

While the use of surrounding medium such as encapsulants and coatings on fiber mats made from nanofibers provide protection against moisture or other environmental factors, the present invention is based on part on the unexpected discovery that the use of clear coatings and encapsulants can enhance the reflectance of a nanofiber substrate (hereinafter referred to as the enhanced reflectance coating). Conventionally, the addition of optically clear materials will lower the reflectances of a medium through the well-known process of index matching. However, the processes and structures described below show that the addition of what would normally be considered an index matching coating unexpectedly increases the reflectance of the nanofibers.

As used herein, a reflectance-enhancing coating can be an optically clear material which has a light transmission of at least 50% of light, and in other cases which has a light transmission of at least 70% of light, and in other cases which has a light transmission of at least 80% of light, and in other cases which has a light transmission of at least 90% of light, and in other cases which has a light transmission of at least 95% of light. Alternatively or in conjunction with these transmission properties, the reflectance-enhancing coating of this invention in one embodiment can include a metallic or ceramic material or can be a coating with metallic or ceramic inclusions to enhance the reflectance properties. These alternative coatings can include a polymeric component as well.

An alternative way to control the transmission and reflection properties of the fiber mat is to introduce features with dimensions on the order of the wavelength of light. Such features, typically 100 nm to 800 nm in size, will promote scattering of the light beam, which increases the reflection coefficient. The features may be of a different refractive index than their surroundings which will impart transmission and reflection properties governed by the Fresnel equations. Examples of materials which can be incorporated into the fiber mat include such materials as polymeric nanofibers, natural and synthetic papers such as PolyArt®, and etched glasses and plastics.

Light scattering occurring in the fiber mat or photoluminescent layer may also be used to increase the ability of the material to diffuse light or spread its intensity over a larger area. In the extreme, light scattering can be used to produce a Lambertian scatterer in which the intensity of the object appears the same regardless of the viewing angle.

The photoluminescent nanofibers of the invention can be created in one embodiment by adding a range of photoluminescent materials to a polymeric or ceramic material that imparts the ability to control the transmission and reflection of light. Such photoluminescent materials include phosphors, nanophosphors, and quantum dots.

Phosphors are a general class of materials that emit radiation when exposed to radiation of a different wavelength. In one embodiment of the invention, such phosphors are generally exposed to either a blue, violet, or ultraviolet light source (i.e., pump) and will absorb photons from the incident light source creating an excited electronic state. This excited state can emit a photon at a wavelength that is generally longer than the pump wavelength through the process of fluorescence or more specifically photoluminescence. Phosphors are generally made from a suitable host material (e.g., aluminum garnet, metal oxides, metal nitrides, and metal sulfides) to which an activator (e.g., copper, silver, europium, cerium and other rare earths) is added. Typically, the phosphor particle size is often 1 μm or larger. Recently, phosphors have been developed that are characterized by particles sizes below 100 nm. These nanophosphors often have similar chemistries as larger particle sizes but scatter light to a lesser degree due to their small size.

Particles having a size less than 50 nm often can be classified as quantum dots. Quantum dots are nanoparticles whose dimensions have an order of magnitude equivalent to or smaller than the size of an electron at room temperature (deBroglie wavelength). When the size of the quantum dot is roughly the same or smaller than the deBroglie wavelength of an electron, then a potential well is created that artificially confines the electron. The size of this potential well determines the quantized energy levels available to the electron, as described in the "particle-in-a-box" solution of basic quantum mechanics. Since the energy levels determine the fluorescent wavelengths of the quantum dot, merely changing the size of the quantum dot changes, to a first approximation, the color at which the quantum dot radiates visible light. Thus, the quantum confinement effects of the quantum dots directly influence the light emitted from the respective quantum dot, and a broad spectrum of colors may be achieved by assembling quantum dots of different sizes.

Representative quantum dots suitable for the invention include a cadmium selenide nanocrystalline core surrounded by a zinc sulfide shell and capped with organic ligands such as trioctylphosphine oxide or a long-chain amine such as hexadecylamine. Such core shell structures are sold by Evident Technologies of Troy, N.Y.

Other representative quantum dots may be fabricated from a variety of materials including but not limited to at least one of silicon, germanium, indium gallium phosphide, indium phosphide, cadmium sulfide, cadmium selenide, lead sulfide, copper oxide, copper selenide, gallium phosphide, mercury sulfide, mercury selenide, zirconium oxide, zinc oxide, zinc sulfide, zinc selenide, zinc silicate, titanium sulfide, titanium oxide, and tin oxide, etc. Of particular utility to the invention are quantum dots having a core of at least one of CdSe, InGaP, InP, GaP, and ZnSe. The optical properties of quantum dots are produced by this nanocrystalline core.

Referring now to the drawings, wherein like reference numerals designate identical or corresponding parts throughout the several views, in various embodiments of the invention, FIG. 1 is a schematic depicting a downlight device 100 made using a reflective fiber mat 102 and photoluminescent fiber mat 104. In FIG. 1, light emerging from a light source 106 (e.g., a LED) is directed toward the photoluminescent fiber mat 104. In one embodiment, a photoluminescent material of the photoluminescent fiber mat 104 can be made by spray coating a layer of doped silicate phosphors onto a thick nanofiber surface. The photoluminescent material can be subsequently partially coated with a layer of red-orange emitting quantum dots (emission wavelength 600 to 620 nm). The light impinging upon the photoluminescent fiber is largely prevented from passing through the fiber base 108 by its reflective properties. Instead, this light, both from the excitation source and that converted by the phosphor, is largely reflected away from the photoluminescent fiber mat 104 and the fiber base 108. This reflected light then encounters the reflective fiber mat 102, that line the walls of the lighting device 100. These reflective nanofibers in the reflective fiber mat 102 serve to mix the blue, green, and red light produced by this structure, so that only white light emanates from the exit of the lighting device. For simplicity, a nanofiber material exhibiting the ability to exhibit high diffuse reflectance across the visible spectrum is termed a nanofiber reflector (NFR). In FIG. 1, the NFR material is shown generically and may or may not include the enhanced reflectance coatings of the invention.

Accordingly, in one embodiment of the invention, the reflective nanofibers are diffuse reflectors. Diffuse reflectance is the process by which a light beam at a given incidence angle and luminous intensity is reflected from a material over a wide range of angles spreading the luminous intensity over these angles. In the ideal case, diffuse reflectance will produce a material that reflects light with equal luminance in all directions.

The polymer nanofiber reflective substrate base can be used in either an undoped form or doped with luminescent materials. The nanofiber reflective substrate base can display a variety of optical properties by varying the transmittance and reflectance of the material, which can be tailored and controlled during the fabrication process.

Doping of nanofibers to create photoluninescent nanofibers (PLNs) is typically performed using a coating process that concentrates the luminescent material at one surface of the substrate (as described in detail below). The phosphors or quantum dots (QD) can be loaded onto nanofibers with a sufficient loading to achieve virtually any desired lighting color. Phosphors are typically coated using either solvent—(e.g., spray coating) or aerosol-based (e.g., dry coating) methods, whereas QDs are typically applied using ink jet printing methods.

While compatible with any phosphor chemistry, doped-silicate, garnet, and selenide phosphors have been demonstrated using for example cadmium selenide cores with zinc sulfide shells. The photostability of these quantum dots (QD) is size dependent, with the larger particles (i.e., orange/red) exhibiting the highest photostability. In one embodiment, a doped-silicate phosphor provides broad emissions centered in the green (~540 nm) and orange QDs are added to provide a narrow emission around 615 nm. The combination in one embodiment, when excited with a blue LED, produces white light (CCT: 2,700 to 5,000 K) with high color rendering indices.

In operation of a typical device, blue light emitted by a LED is directed at the PLN, and a portion of the blue light is converted into green and red emissions that are diffusely reflected away from the PLN. Unconverted portions of the incident blue radiation are also diffusely reflected by the nanofiber base of the PLN. The diffusely emitted light is confined and directed by a second nanofiber material that is designed to exhibit high diffuse reflectance (R~95%) (i.e., a nanofiber reflective NFR layer). In various embodiment of the invention, diffuse reflectance values range from 70% to 80%. In various embodiment of the invention, diffuse reflectance values range from 80% to 90%. In various embodiment of the invention, diffuse reflectance values range from 90% to 95%. In various embodiment of the invention, diffuse reflectance values are greater than 95%. The high reflectance of the NFR material minimizes light absorption and also serves to mix the red, green, and blue colors produced by the device. Light produced emerges from the device well mixed with good homogeneity.

In FIG. 1, the LED is in the light emission path and could absorb some of the emitted light. This disadvantage can be avoided with a downlight device made using the reflective nanofiber and photoluminescent nanofibers where the LED is moved to the exterior of the luminaire to remove the LED from the light beam and to provide for better heat sinking of the LED. Light from the LED enters the device through an aperture and is directed at the PLN. The NFR material lines the wall of this device as discussed above.

A typical spectrum obtained using a Cree XRE LED (Part No. CREROY-L1-00001-00801) operated at 200 mA to 800 mA. The measured properties of the device at an operational current of 200 mA were:

| | |
|---|---|
| CCT: | 3852 K |
| CRI: | 92 |
| NIST CQS: | 91 |
| Duv: | 0.003 |
| Luminous Efficacy: | 53 Lumens/Watt |

Duv is a measure of how far a given set of chromaticity coordinates lie from the Planckian locus (i.e., the blackbody radiator point for a give CCT). Low Duv values are preferred. CQS stands for color quality scale.

The introduction of the nanofiber liner in this example without the enhanced reflectance coatings of the invention increased the optical power output from this device by 49.8%. This increase is believed to be due to reduced absorption of the light in the down light configuration due to the presence of the reflective nanofiber material. Since the nanofibers exhibit high reflectance (typically greater than 90%), the use of the nanofiber material as a liner even without the enhanced reflectance coatings of the invention significantly reduces absorption by luminaire materials.

While not being limited to a particular phenomenological explanation, it is believed that the high reflectance of this material is due to Mie scattering arising from the nanoscale manipulation of the optical properties of the nanofiber. The contrast in index of refraction between the nanofiber (n~1.5) and air creates sites for Mie scattering of light. The intensity of the reflected light (i.e., backscattering) will be proportional to the angular scattering distribution and the number of scattering sites. In smooth nanofibers, the scattering sites are provided by the nanofibers themselves and the areas between adjacent nanofibers. Since the probability for backscattering (i.e., reflection) is optimal for visible radiation when this spacing is on the order of the wavelength of light, increasing substrate density (i.e., decreasing void volume) would improve reflection intensity to a point. On porous nanofibers, the introduction of surface pores increases the number of scattering sites and increases backscattering efficiency as a function of thickness. In addition, surface pores of diameter 100-250 nm can be shown to possess a high probability for backscattering of visible radiation. Hence, the properly designed porous nanofibers of the invention can also be shown to be efficient reflectors of visible radiation.

In one embodiment of the invention, an additional mechanism to impart a discontinuity in the index of refraction is provided by the introduction of nanomaterials into the nanofiber. Typically, these nanomaterials will have diameters between 50 nm and 400 nm, and be composed of materials that are known to exhibit low absorbance in the visible spectrum. Examples of such materials include $BaSO_4$, Teflon, $TiO_2$, and $Al_2O_3$. Such additives would be chosen to have an index of refraction different from that of the polymer used to make the nanofiber.

In one embodiment of the invention, the reflection characteristics of the nanofiber can be altered. Typically, nanofiber substrates will exhibit diffuse reflection approaching Lambertian behavior. However, a certain amount of gloss (i.e., specular reflection) can be introduced into the substrate either by intentionally electrospinning in a manner that produces occasional larger features or by adding specular reflective material such as Al flake.

Figure 2:
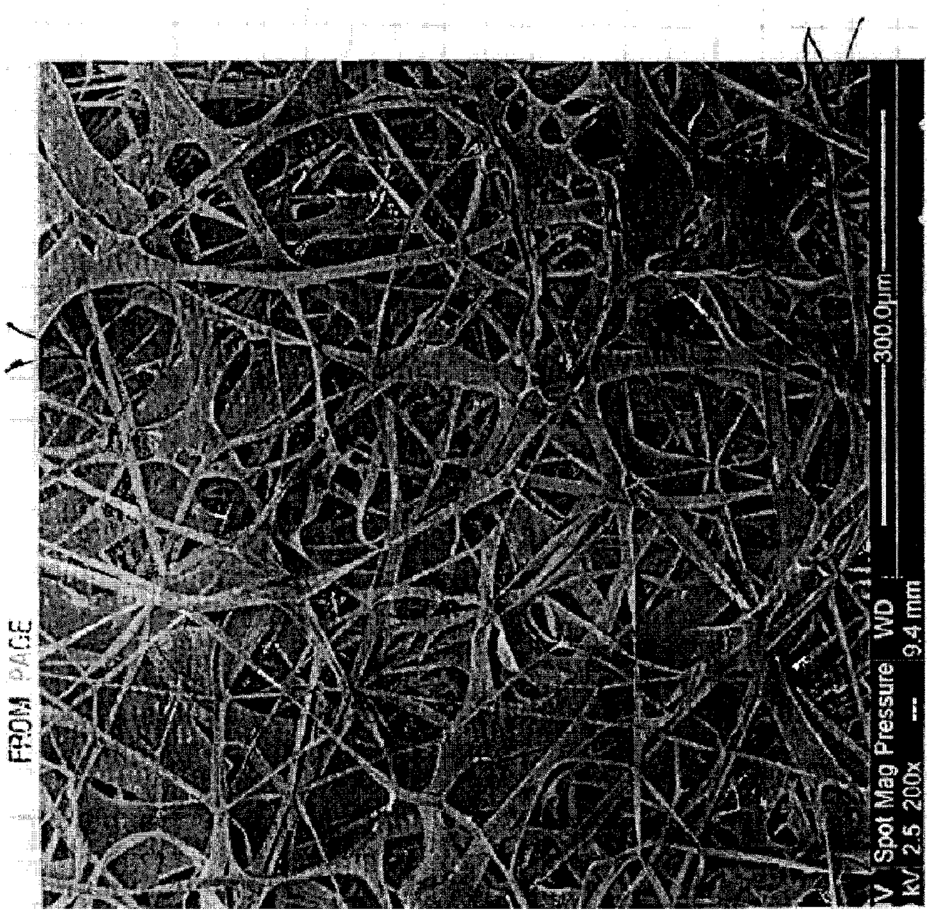
FIG. 2 is a micrograph of a mat of reflective fibers having large lateral reflective surfaces.

FIG. 2 shows an example of reflective fiber mat. Essentially, the electrospinning operation was conducted in such a manner as described in PCT/US2008/066620entitled "Long-Pass Optical Filter Made from Nanofibers" to produce flat-shaped fibers, ribbon-shaped fibers, or otherwise non-cylindrical shaped fibers. The width of many of these fibers exceeds 50 μm. In this embodiment of the invention, the reflective fiber mat material includes nanofibers with laterally extending surfaces for reflection of the light, in particular for enhancing specular reflection from the fiber mat.

The result is a material that has "gloss" and exhibits some specular reflection, as compared to the normal nanofiber structure which has no gloss and exhibits only diffuse reflection.

The making of flat or ribbon fibers or otherwise non-cylindrical shaped fibers is described in earlier noted applications incorporated by reference, including PCT/US08/66620 "LONG PASS OPTICAL FILTER MADE FROM NANOFIBERS"; and WO 2009-140381 "POROUS AND NON-POROUS NANOSTRUCTURES AND APPLICATIONS THEREOF." In short, a polymer solution 2-10 percent (by weight) is mixed with an additive that is not volatile but that is of a high dielectric constant relative to the polymer to achieve the porosity, the dielectric constant of the additive compound in one embodiment is in the range of 50-189. In one embodiment, N-methylformamide is used as a liquid organic compound with a suitably high dielectric constant and is added to the solvent mixture with weight percentage of 1-20 wt %. Toluene is one solvent that can be used with the N-methylformamide. In one embodiment, toluene is used in the electrospinning mixture as a large weight percent of the mixture, for example in a range of the 80-99 wt %. Porous poly(methyl methacrylate) PMMA polymer nanofibers produced from these toluene/methyl formamide/PMMA are shown as an example in FIGS. 3 and 4. Conditions for the electrospinnning follow closely the illustrated example above except for the inclusion of the toluene, the substitution of the methyl formamide for the dimethylformamide, and the substitution of the PMMA for the polystyrene.

The average pore size obtained using this approach was seen to depend on the weight fraction of the additive in the spinning solution. This effect was demonstrated for the range of 2% and 20% (by weight) of N-methylformamide. At levels exceeding 20%, the pores were found to be too large to maintain the cylindrical shape of the nanofibers. Under these conditions, the porous fiber tended to collapse and fold into a ribbon.

Figure 4:
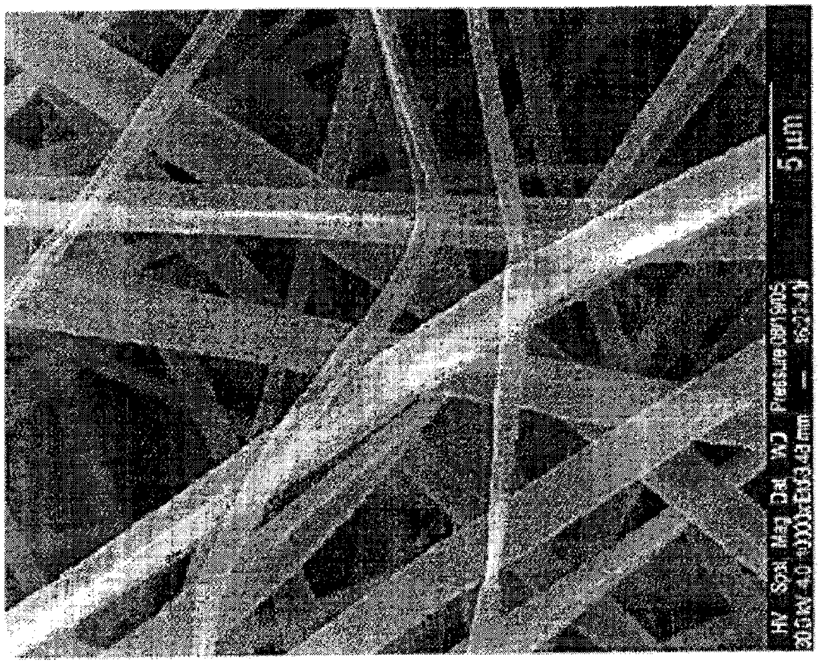
FIG. 4 is another micrograph of a mat of reflective fibers showing flatter-shaped nanofibers.

FIG. 3 shows scanning electron microscopy (SEM) images of porous PMMA nanofibers made under electrospinning conditions +20KV, 1.0 ml/Hr, collector grounded. Concentration of the organic compounds in the solvent mixture for the samples: (a) 98% toluene, 2% N-methylformamide; (b) 95% toluene, 5% N-methylformamide; (c) 90% toluene, 10% N-methylformamide; (d) 80% toluene, 20% N-methylformamide. FIG. 4 shows additional scanning electron microscopy (SEM) images of porous PMMA nanofibers at lower magnification made under electrospinning conditions: +20KV, 1.0 ml/Hr, collector grounded. Concentration of the organic compounds in the solvent mixture for the samples: (a) 98% toluene, 2% N-methylformamide; (b) 95% toluene, 5% N-methylformamide; (c) 90% toluene, 10% N-methylformamide; (d) 80% toluene, 20% N-methylformamide.

It is apparent that the addition of high dielectric constant compound, such as N-methylformamide, make the resultant nanofibers porous, and eventually into a ribbon shape, as compared with round, cylinder shape for smooth nanofiber prepared with a single solvent system. For nanofibers prepared with lower concentration of N-methylformamide, such as 2%-5%, instead of a perfect sphere or circular shape on the nanofiber surface, the pore structures tends to become slightly more elongated, when viewed from outside the fiber with an SEM, especially along the longitudinal direction of the resultant nanofiber. When the concentration of the N-methylformamide increases 10%-20%, the round pore opening tends to become even more elongated along the longitudinal direction of the resultant nanofiber, when viewed from outside the fiber with an SEM. When the N-methylformamide concentration reaches to 20%, the pores started to merger into each other and form very rough surface features on nanofiber surface. These features can be characterized as round pores at certain experimental conditions and the existence of the threshold is clearly observed between 5% and 10% weight ratio N-methylformamide, where the pore size significantly increases and the shape becomes more elongated, when viewed from outside the fiber with an SEM.

It is observed that the pore openings on the nanofibers range in shape from slightly elongated shapes to oval shapes and have an aspect ratio in the range of 1.1:1 to 10:1. The pores are partially embedded into the surface of the nanofiber and in some instances have an estimated depth of 5-100 nm, although smaller pore depths may not be readily detectable. The pores have an estimated length from 5-100 nm, although smaller pore lengths may not be readily detectable. The pores thus expose an interior surface of the nanofiber, providing for an increased surface area, as compared to a similar diameter nanofiber without pores. Adjacent pores can be totally separated from each other by a nanofiber wall material in between, or adjacent pores can partially overlap forming larger cavities in the nanofibers.

Examples of other high dielectric constant compounds suitable for the invention include, but are not limited to: N-Methylformamide, N-Methylacetamide, N-Methylpropanamide, N-Ethylacetamide, N-Propylpropanamide, Formamide, N-Butylacetamide, N-Ethylformamide. Their compatible solvents include but not limited to toluene, dimethylformamide, chloroform, dichloromethane, dimethylacetamide, and acetone. The polymers include but not limited to are Poly(methyl methacrylate), Poly(butyl methacrylate), Poly(Benzyl methacrylate), Poly(caprolactone), Poly (vinyl alcohol), Poly(Acrylonitrile), Poly(carbonate), and blends thereof.

The following table provides a listing of the reflectance of common materials. In one embodiment of the invention, materials of this optical type are introduced for the specular reflective material. Such materials for example can include Al, Au, Ag, $TiO_2$, ZnO, $BaSO_4$, and Zn in particle or flake form.

Reflectance of Common Materials

| | |
|---|---|
| Polished Al | 0.60-0.70 |
| Etched Al | 0.70-0.85 |
| White Plaster | 0.90-0.92 |
| White Paint | 0.75-0.90 |
| Porcelain Enamel | 0.65-0.90 |
| White Glass | 0.75-0.80 |

In one embodiment of the invention, the addition of a nanofiber material designed to provide high reflectance can be used to increase the energy efficiency of lighting devices. The nanofiber can be used as a liner in downlights and for lighting troffers.

Thus, the reflective nanofiber mat or substrate of the invention in general provides the following embodiments:

1. Nanofiber materials lining the walls of a luminaire such as a downlight, light troffer, or other lighting device.

2. A nanofiber fiber mat or substrate including smooth, randomly oriented nanofibers with dimensions comparable to the wavelength of visible light or flat, ribbon-shaped fibers with surface pores with diameters comparable to the wavelength of light that impart of textured surface morphology.

3. A nanofiber material functioning as a diffuse (i.e., Lambertian) reflector or including features or additives that impart a gloss characteristic to the substrate. Such a substrate may exhibit both specular and diffuse reflection with the ratio of the two controlled by the relative composition of diffuse reflection sites and specular reflection sites. This structure can be fabricated in an electrospinning chamber using for example needle spinning as described in the related applications.

This structure can also be fabricated using a roll-to-roll spinning process as in an Elmarco Nanospider tool, as described in U.S. Pat. Appl. Publ. Nos, 2009/0148547 and 2010/0034914, the entire contents of these patent documents incorporated by reference herein. As described therein, production of nanofibers through electrostatic spinning of polymer solutions occurs by way of a spinning electrode which rotates around its longitudinal axis and having spinning elements positioned uniformly along the circumference of end faces which are subsequently plunged under the level of polymer solution in the reservoir of polymer solution. Due to the physical properties of the polymer solution and the spinning electrode, the spinning elements emerge from the reservoir covered by the polymer solution. Having emerged, the spinning elements with polymer solution subsequently approach to a collecting electrode, which is grounded or connected to an opposite voltage source other than that of the spinning elements of the spinning electrode. In the moment, when the spinning element approaches sufficiently to the collecting electrode, between it and the collecting electrode as a result of difference of their electric potentials, there is created a sufficiently strong electric field, which along the whole length of the spinning element initiates the spinning process. During the spinning process the polymer nanofibers are created from the polymer solution on surface of the spinning element, which through the action of force of electrostatic field move towards the collecting electrode.

In this roll-to-roll process, the spinning element remains in a position suitable for spinning of the polymer solution on its surface only for a certain time interval. After expiration of this time interval, the spinning element is moved away from vicinity of the collecting electrode and again plunged into the polymer solution in the reservoir of polymer solution. Meanwhile, other spinning elements containing the polymer solution for spinning on their surface are in position to electrospin, permitting a continuous production of nanofibers in this roll-to-roll process.

Other techniques can be used to fabricate the fibers of the reflective fiber mat of this invention. These techniques include electroblown spinning as described in U.S. Pat. No. 7,585,451 (the entire contents of which are incorporated by reference), centrifugal spinning as described in U.S. Pat. Appl. Publ. No. 2009/0160099 (the entire contents of which are incorporated by reference), force spinning as described in U.S. Pat. Appl. Publ. No. 2009/02329020 (the entire contents of which are incorporated by reference), and rotary spinning as described in U.S. Pat. Appl. Publ. No. 2010/0247908 (the entire contents of which are incorporated by reference).

In one embodiment of the invention, preference for a nanofiber structure that exhibits gloss or partial specular reflectance over traditional nanofiber structures (which exhibit diffuse reflectance) is provided by choice of the electro spinning parameters including, but not limited to:

1. Polymer solution concentration;
2. Polymer solution flow rate;
3. Electro spinning voltage gradient;
4. Spinneret to collector distance;
5. Spinneret size; and
6. Spinning chamber environment;

whose parameters determine the resultant relative composition of diffuse reflective sites to specular reflective sites.

4. A nanofiber fiber mat or substrate including additives such as high dielectric constant materials (e.g., ZnO, $BaSO_4$, $TiO_2$, $Al_2O_3$, etc.) which provide additional scattering sites and increase reflectance. These additives can be dispersed into the spinning solution and a composite of the nanofiber and high dielectric constant material is provided directly by spinning operation. In one embodiment of the invention, random, textured (i.e., porous) nanofibers are the most effective for use as optical filters and wavelength selective reflectors, as discussed above. In contrast, thin layers of smooth round nanofibers have been found to be poor scatterers of lights and are not as effective for either use.

More specifically, the nanofiber substrate can be coated with the high dielectric constant material using methods described in U.S. Patent Application 2008/0113214, herein incorporated by reference. In one embodiment of the invention, as discussed above, high dielectric constant materials such as for example ZnO, $BaSO_4$,$TiO_2$, $Al_2O_3$, etc can be applied to the fiber mats after electrospinning.

5. Photoactive fillers such as $TiO_2$ can be added to the nanofiber to provide continual cleaning of the nanofiber under the blue irradiation of the pump LED used in a solid-state lighting device. $TiO_2$ is a known photocatalyst and when excited by wavelengths of sufficient energy will oxidize organic compounds. The badgap of $TiO_2$ can be adjusted using known techniques such that the excitation wavelengths provided in solid-state lighting (i.e., 350 to 470 nm) are sufficient to initiate the photo-oxidation reaction. $TiO_2$ and similar photocatalytic additives can be dispersed into the electrospinning solution and a composite of the nanofiber and the photocatalytic material is provided directly by electrospinning operation. Alternatively, the nanofiber substrate can be coated with the photocatalytic material using methods described in U.S. Patent Application 2008/0113214, herein incorporated by reference.

6. The enhanced reflectance coatings of the invention provide an improved diffuse reflector of light intended for use in a variety of optical applications including displays, solid-state lighting, high efficiency lighting, radiation detectors, and analytical instrumentation. The enhanced reflectance coatings provide the mechanism for high-efficiency reflectance of visible light (e.g., reflectance values>0.95), environmental stability, and a thin profile (e.g., as thin as 200 microns).

Figure 5:
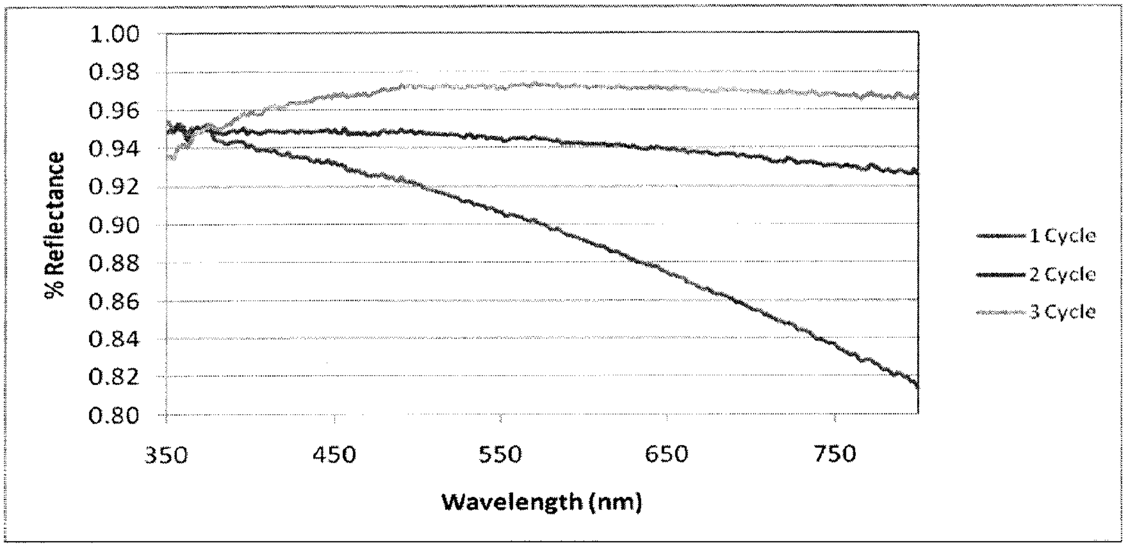
FIG. 5 is the measured reflectance values for uncoated NLITe™ Nylon-6 nanofiber reflector in three different basis weights made by one or more cycling of the material one or more times through the electrospinning tool.

As shown in FIG. 5, a base nanofiber material can be constructed with average fiber diameters (AFD) comparable to the wavelength (λ) of light to produce a reflective material, if the basis weight is high enough. However, in some instances, it has been observed that the reflectance of the material drops slightly at longer wavelengths (λ), presumably due to reduction of the scattering coefficient as the λ/(AFD) ratio decreases. The primary solution to this decrease in reflectance is to increase the basis weight of the nanofiber substrate either by adding thickness (at the same AFD value) or by using a larger AFD. The impact of basis weight on reflectance is shown in FIG. 5.

Specifically, FIG. 5 depicts the measured reflectance values for an uncoated nanofiber reflector for three different basis weights made by one or more cycling of the material through a roll to roll tool such as the above-noted Elmarco tool. Basis weight (in units of grams per square meter (GSM)) is commonly used in the industry to provide a measure of sample thickness and porosity. Thicker, more dense materials will typically have a higher basis weight and values in excess of 900 GSM can be observed in felt materials. Thinner, high porosity materials will have a lower basis weight, and values below 10 GSM are possible. The basis weight of the one cycle material is roughly 9 g/m2 (GSM), the two cycle material has a basis weight of roughly 18 GSM, and the three cycle material has a basis weight of roughly 27 GSM.

Low basis weights are often desirable due to the reduced cost arising from lower intrinsic materials costs and higher manufacturing speed (i.e., throughput). However, as shown in FIG. 5, lower basis weights can also produce lower reflectance values at long wavelengths. Hence, structures that produce higher reflectance at lower basis weights are potentially valuable.

Figure 6:
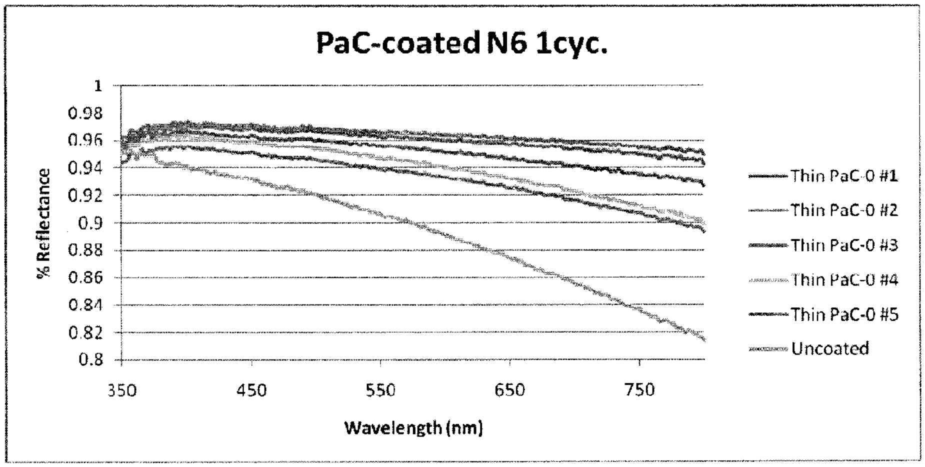
FIG. 6 is the measured reflectance values for an uncoated one-cycle nylon nanofiber substrate (estimated basis weight 9 gram per square meter (GSM)) and a series of five different one-cycle nylon substrates coated with parylene. The parylene thickness is estimated to be 300 nm.

This embodiment of the invention is based on the unexpected discovery that an equivalent increase in reflectance, particularly at long wavelength values, can be achieved by applying a "conformal" coating to the nanofibers. In one example of the invention, parylene, which is a coating that is clear in the visible spectrum, is applied to nylon nanofiber substrates of various thicknesses and basis weights. The index of refraction of nylon typically ranges from 1.53 to 1.59, while the index of refraction of parylene is 1.64. The small difference in refractive indices would normally not be expected to produce a large difference in reflectance, although it may produce a slight "haze" in a material. However, as shown in FIG. 6, the application of a thin parylene coating to a nylon reflector substrate significantly improved the reflectances of the material at all values, but especially at long wavelengths. The thickness of the parylene coating in this instance was estimates to be 70 nm.

Specifically, FIG. 6 is a depiction of reflectance measurement of an uncoated nylon nanofiber substrate (estimated uncoated basis weight 9 GSM) and a series of five different one-cycle nylon substrates each coated with parylene. The parylene layer thickness is estimated to be 300 nm.

Figure 7:
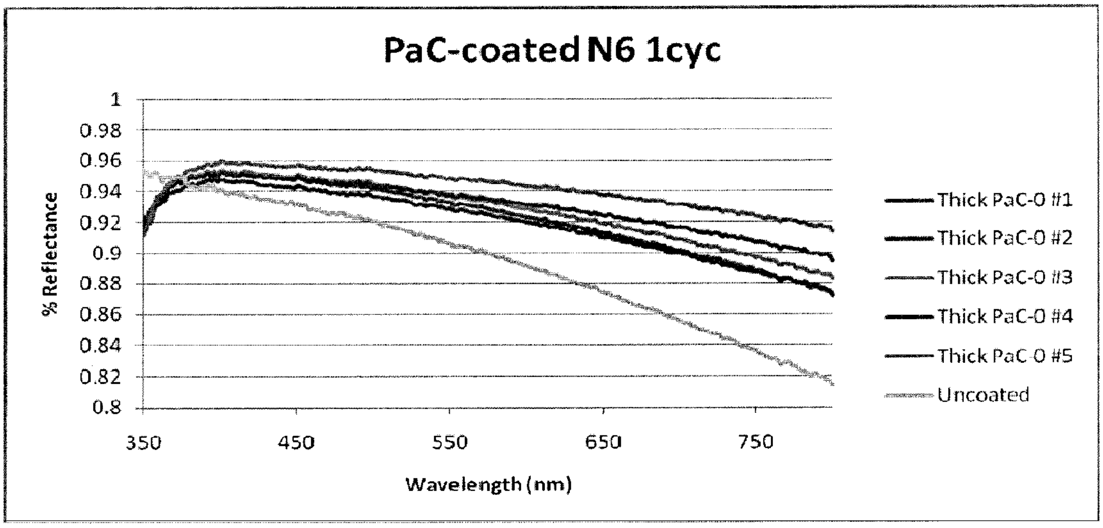
FIG. 7 is the measured reflectance values for an uncoated one-cycle nylon nanofiber substrate (estimated basis weight 9 GSM) and a series of five different one-cycle nylon substrates coated with parylene. The parylene thickness is estimated to be 4,500 nm.

There appears to be an upper limit on the thickness of the parylene coating that achieves this unexpected effect. A similar series of one-cycle nylon substrates were coated with a thick coating of parylene, which was estimated to be 2,209 nm. FIG. 7 is a depiction of reflectance measurement of an uncoated nylon nanofiber substrate (estimated uncoated basis weight 9 GSM) and a series of five one-cycle nylon substrates coated with parylene. As shown in FIG. 7, in this instance, the reflectance value did not increase as much at the long wavelengths, as observed for the thinner coatings. In addition, the thicker coating began to absorb at wavelengths below 400 nm, resulting in a drop in reflectance. The degree of this decline in reflection is dependent upon the properties of both the nanofiber substrate and the coating.

Figure 8:
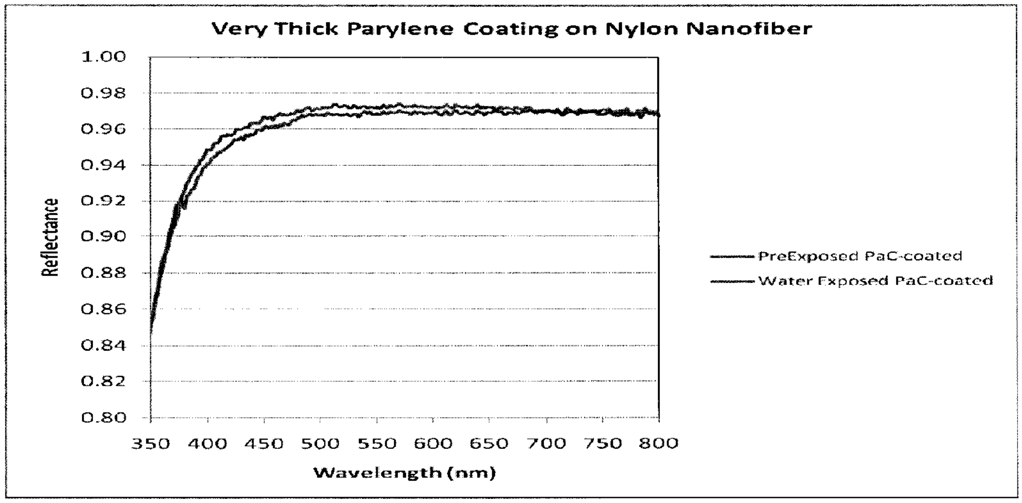
FIG. 8 is the measured reflectance values for parylene coated nanofiber substrate before and after water exposure. The parylene thickness is estimated to be 5,000 nm.

FIG. 8 is a depiction of reflectance measurement of two parylene coated nylon nanofiber substrates before and after a two week water soak test that consisted of complete submission in a water bath for two weeks. The parylene coating thickness is estimated to be several microns. In this structure, a flat reflectance value was achieved from 500 nm to 800 nm. As shown in FIG. 8, very thick coatings of parylene can produce a flat reflectance profile above 500 nm. In one embodiment of the invention, other materials with low UV absorption can be used to minimize or eliminate this drop in reflectance.

Figure 9A:
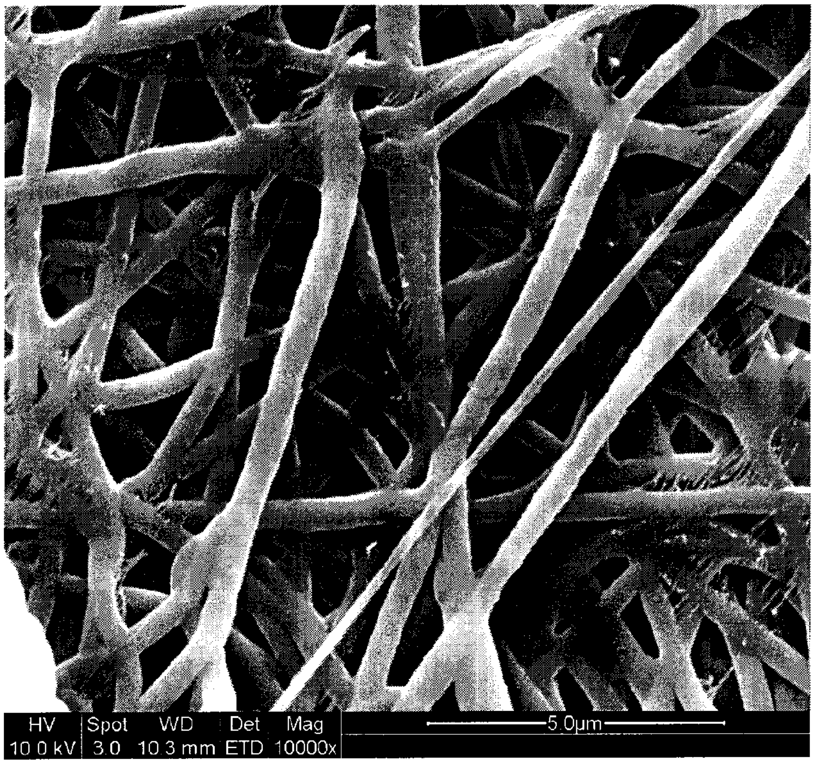
FIG. 9 is scanning electron microscope (SEM) images of one-cycle nylon nanofiber substrate (estimated basis weight 9 GSM) cost with roughly 70 nm of parylene (the image magnification is 10,000B in A and 2,000X in B).
Figure 9B:
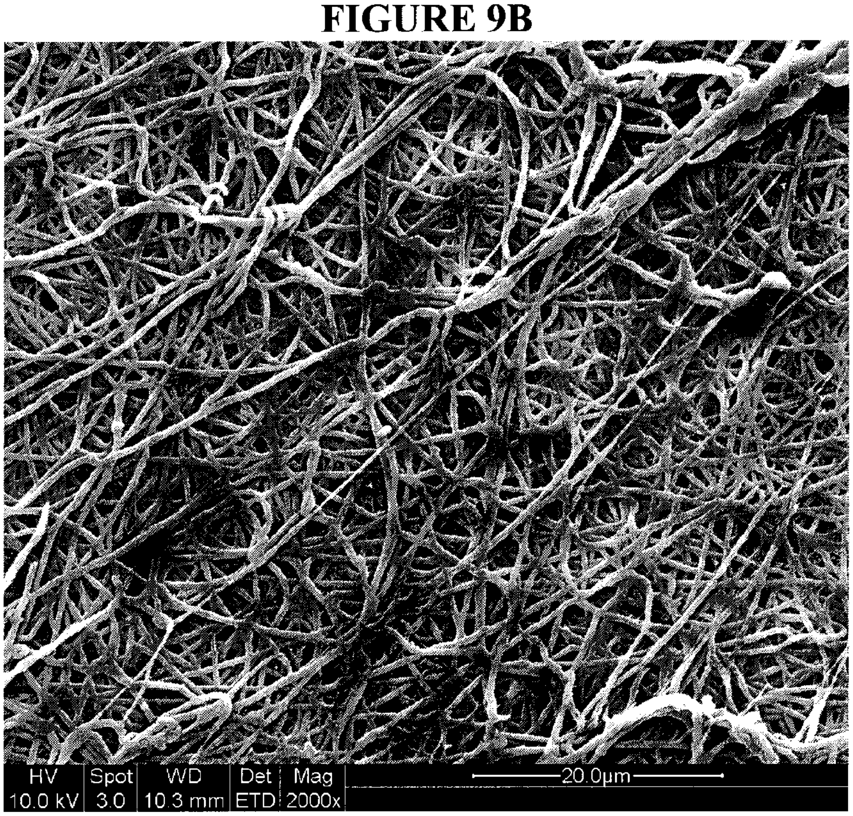

FIGS. 9A and 9B are depictions of scanning electron micrograph (SEM) images of a nanofiber substrate coated with parylene (roughly 70 nm). FIG. 9A is an image taken at 10,000×, while FIG. 9B is an image on the right was taken at 2,500×. The presence of the bridging fibers and other defects is readily apparent near the junction of adjacent fibers, such as in the lower right-hand corner of the image at the higher magnification.

While not be limited to any particular theory, one possible explanation for this effect is the structure formed by the nanofiber-coating composite. As can be seen in FIGS. 9A and 9B, the coating roughly conforms to the fiber but also forms bridging fibers or bridging elements, presumably of parylene, between the adjacent nylon nanofiber. Hence the resulting structure is one of a nylon fiber base, a coating of parylene or similar material roughly conforming to the shape of the fiber, and bridging fibers formed between two adjacent nanofibers. There is likely a slight mismatch in index of refraction between the coating and the nanofiber, but not sufficient to produce significant light scattering alone. Instead, the improved light scattering, especially at long wavelengths is believed to arise from "defects" in the coating, e.g., evidenced by the bridging fibers that produce additional scattering sites.

The index of refraction of air is 1.0, which provides a significant difference (i.e., Δn~0.55) with the coated nanofiber substrate to facilitate reflection via light scattering. Hence, any coating defects would increase reflectance. In addition, the increased fiber diameter (due to the coating building up on the nanofibers) may also improve reflectance at long wavelengths, but would be expected to reduce reflectance at short wavelengths. The enhanced reflectance coatings of the invention apparently overcome this shortcoming and provide high reflectance at both short and long wavelengths.

Figure 10A:
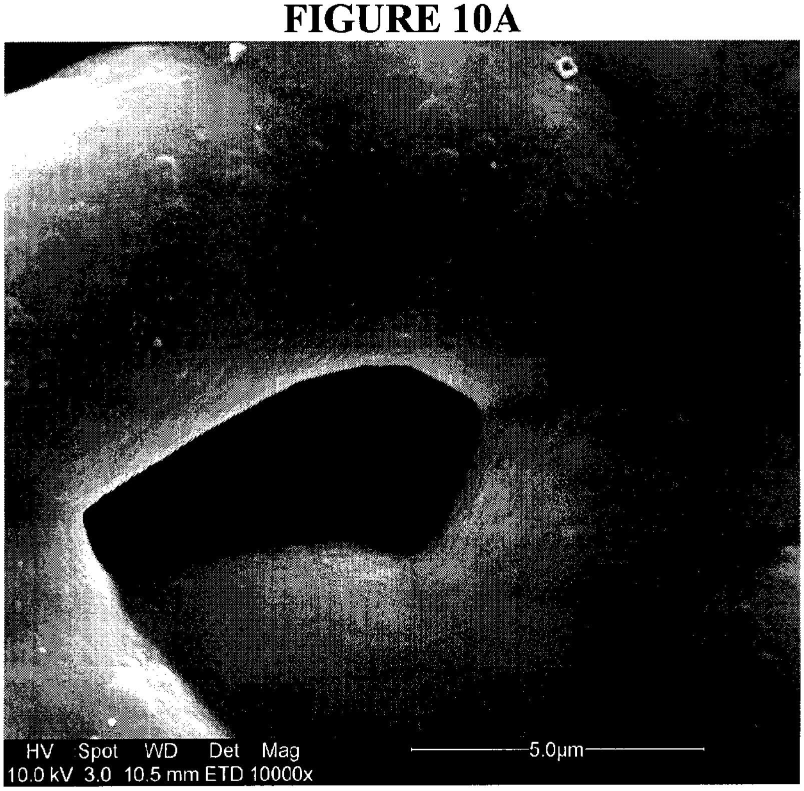
FIG. 10 is scanning electron microscope (SEM) images of one-cycle nylon nanofiber substrate (estimated basis weight 9 GSM) cost with roughly 4,500 nm of parylene (the image magnification is 10,000B in A and 2,000X in B).
Figure 10B:
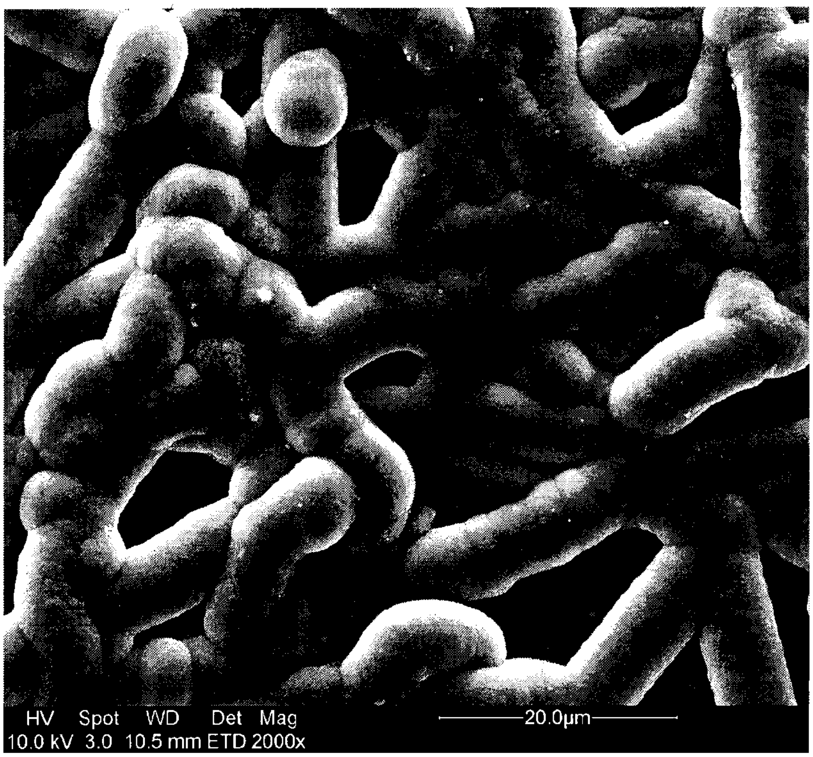

Thicker coatings of the parylene material have been found to produce an entirely different structure. FIGS. 10A and 10B are depictions of scanning electron micrograph (SEM) image of a nanofiber substrate coated with parylene (roughly 2209 nm). FIG. 10A is an image taken at 10,000×, while FIG. 10B is an image on the right was taken at 2,500×. The appearance of defects in the coating, which may serve as additional light scattering sites is apparent by the nodules and segments present in the coating. As shown in FIGS. 10A and 10B, nodules and segmentation can be observed in the thicker coating. The nodules and segmentation may arise from multiple factors including defects in the coating, uneven growth of the coating, shadowing of parts of the fiber, and other factors. However, since these nodules represent discontinuities in the material, these nodules and segmentations are potential light scattering sites and may be a source of the high reflectance of the coated material.

In the extreme case of a thick coating, high, flat reflectance values are also obtained similar to that shown in FIG. 8. In this instance, the surface again takes on a different appearance, that of more of a planarized material.

While the enhanced reflectance coatings of the invention have been demonstrated with parylene-coated on nylon nanofibers as the base substrate, other polymer nanofibers can be used as the base substrate including for example but not limited to polyethylene, polypropylene, polyethylene terephthalate, poly(methyl methacrylate), polysulfone, poly(vinyl alcohol), silicone, poly (vinylidene fluoride), poly(dimethyl siloxane) These nanofiber substrates can be fabricated using a variety of methods including, but not limited to, electrospinning, melt blowing, electroblowing, centrifugal spinning, force spinning, and rotary spinning.

A list of the index of refraction of various polymers (suitable for the invention but not limited to this list) is given below:

| | |
|---|---|
| Poly(dimethyl siloxane) | n = 1.40 |
| Poly(vinylidene fluoride) | n = 1.42 |
| Poly(ethylene oxide) | n = 1.454 |
| Poly(methyl methacrylate) | n = 1.49 |
| Poly(propylene) | n = 1.49 |
| Poly(vinyl alcohol) | n = 1.50 |
| Poly(ethylene) | n = 1.51 |
| Nylon 6 | n = 1.53 |
| Nylon 6,10 | n = 1.57 |
| Nylon 6,6 | n = 1.57 |
| Polycarbonate | n = 1.59 |
| DuPont Selar Polyamide | n = 1.59 |
| Polysulfone | n = 1.633 |
| Polyethylene Terephthlate | n = 1.64-1.67 |

In addition, a variety of coating methods may be used to create the enhanced reflectance coatings of the invention including, but not limited to 1. Vapor deposition of reactive monomers such as parylene,
2. Perfluorosilane based coatings available from Alexium Inc. (Greer, S.C.),
3. Vacuum plasma coatings, atomic layer deposition coatings from such as the Repellix coating from Integrated Surface Technologies (IST) (Menlo Park Calif.),
4. Perfluorinated coatings such as those available from P2i (Oxfordshire, UK),
5. Phosphonate dip coatings such as those from Aculon, Inc. (San Diego, Calif.),
6. Silicone coatings.

The refractive index of these coatings is likely to vary from roughly 1.35 (for some of the perfluorinated coatings) to >1.70 for ceramic nanocomposite coatings such as those from IST.

In addition, the enhanced reflectance coatings of the invention can be applied with a variety of coating methods including but no limited to spray coating, roller coating, extrusion coating, dip coating, inkjet printing, nanoimprint lithography, transfer coating, and dip-pen lithography.

Lighting Devices

A lighting device of the invention includes a reflector (e.g., a mat of reflective fibers as discussed above) and a source of primary radiation. This lighting device can be used by itself as a luminaire (i.e., lighting fixture) or in some cases can be used as a lamp that is contained in a luminaire. The reflector configuration including the mechanism for providing primary radiation and the mechanism for supporting reflective nanofiber sheets (e.g., including the enhanced reflectance coatings of the invention) provides for efficiently directing the light emanating from the lighting device. The reflective nanofiber material used in this device is configured to provide a structure that takes advantage of the light scatter from the thick nanofiber substrate to provide a high (>0.80) reflectance as described above. The nanofiber substrate can be made from a variety of polymers including but not limited to polyamides, polyacrylates, poly(methyl methacrylate), and poly(butyl methacrylate). The appropriate level of reflection is produced by providing a material containing discontinuities in the dielectric constant produced by either 1) a large macropore structure created by the void volume between adjacent fibers, 2) a macropore structure created by the introduction of pores onto the surface of the nanofiber, 3) the addition of high dielectric constant materials to the nanofiber, and/or the provision of the enhanced reflectance coatings of the invention.

In an additional embodiment, the source of primary radiation impinging upon a reflective nanofiber is provided by a photoluminescent nanofiber made by combining luminescent particles and nanofibers, as described in U.S. application Ser. No. 11/559,260, which as noted above the entire contents of which are incorporated herein by reference. In this embodiment, there exists a mechanism for excitation illumination, and a mechanism for supporting luminescent sheets (formed from the luminescent particle/fiber composites described above). This lighting device can be used by itself as a luminaire (i.e., lighting fixture) or in some cases can be used as a lamp that is contained in a luminaire. The reflector configuration including the mechanism for exciting illumination and the mechanism for supporting luminescent sheets provides for efficient light conversion and emission from the luminescent particle/polymer composites described above. The reflector configuration of the invention is configured to accommodate the light-conversion material in a structure taking advantage of the light scatter from the nanoparticle/nanofiber composites described above. Light produced by the luminescent sheets strikes the reflective nanofibers and is directed toward the output of the lighting device. The high reflectance of the reflective nanofibers results in a high optical power emanating from the device than would occur in the absence of the reflective nanofiber.

The luminescent particle/polymer fiber composites can include luminescent nanoparticles supported by organic nanofibers. The aspect of the invention permits the luminescent nanoparticles to effectively be suspended in air by the nanofibers. Most light-conversion phosphors in conventional white-light LEDs (light emitting diodes) are held within a solid material having a significant index of refraction, and various strategies are used with these materials to overcome total internal reflection and to extract the light efficiently from the solid material. The luminescent particle/polymer composites, including nanoparticle/nanofiber composites, (hereinafter referred to as "the luminescent sheet") described above do not suffer from total internal reflection.

In one embodiment of the invention, light conversion accepts short-wavelength light and converts the short-wavelength light to longer wavelengths. The combination of an LED producing short-wavelength light (for example, blue light) and an appropriate light-conversion mechanism (for example, one producing yellow light) provides an efficient way of producing white light for general illumination. In one embodiment of the invention, a range of incident (excitation) wavelengths are used which provide excitation (for example, light ranging from blue to ultraviolet). In one embodiment of the invention, the light-conversion mechanism of the particles emits a single color in response to the excitation light. In one embodiment of the invention, the light-conversion mechanism of the particles emits a broad band of wavelengths representing a wide range of colors (for example, from blue to red).

In one embodiment of the invention, the light-conversion material is relatively thick or reflective, so that the excitation light will not pass through the luminescent sheet in a significant amount, but is instead reflected to a high degree. A value of less than 70% transmittance in general would make the light-conversion material an optically thick material. Such an optically thick material is provided by a nanofiber substrate with a thickness in excess of 50 μm. Under this condition, the luminaire in this embodiment of the invention is arranged so that both sides of the luminescent sheet are illuminated by the excitation light, and emitted light is collected from both sides of the luminescent sheet for emanating from the luminaire.

In one embodiment of the invention, illumination from the excitation light source does not directly escape the luminaire. Accordingly, any light escaping the luminaire in this embodiment includes both 1) a component of the excitation light has been scattered from a matrix of the luminescent sheets without a change in wavelength (for example, blue light) and 2) emitted light produced by active luminescent particles (for example light having a longer wavelength than the excitation light such as yellow light).

Figure 11:
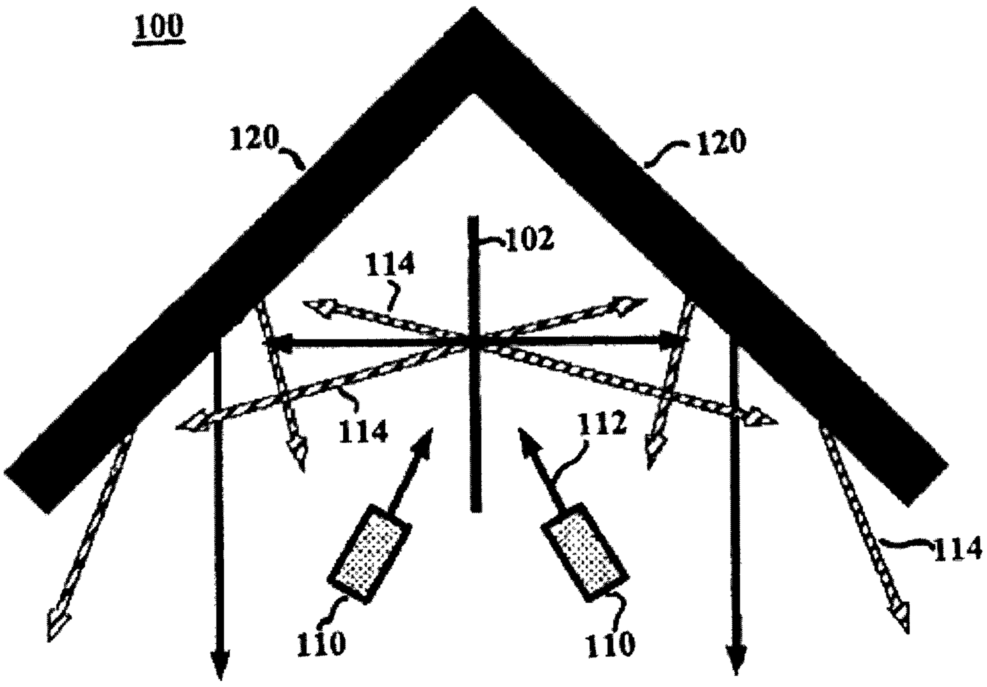
FIG. 11 is a cross-sectional depiction of a luminaire structure according to one embodiment of the invention.

As shown in FIG. 11, light sources 110 (producing the excitation light) produce light that is directed away from the exit of the luminaire shown at the bottom of the luminaire. More specifically, FIG. 11 is a cross-sectional depiction of a luminaire structure 100 according to one embodiment of the invention. The vertical center line depicts a luminescent sheet 102. Light sources 110 (e.g., light emitting diodes LEDs or other light sources) produce excitation light 112 which is directed to the luminescent sheets 102. In other embodiments, one or more separate (or integrated) excitation light sources 110 can be provided for each side of the luminescent sheet 102. Luminescent particles in the luminescent sheets 102 upon interaction with the primary light (i.e., excitation light 112) emit secondary light at a wide range of wavelengths. A reflector 120 containing reflective nanofibers with enhanced reflectance coatings made as described above reflects light back toward the luminescent sheet 102. Reflector 120 can include the enhanced reflectance coatings of the invention described above. The reflector 120 also reflects some light out of the luminaire 100. Excitation light 112 (for example, blue light) thus impinges on the luminescent sheet(s) 102 from multiple angles and impinges on the luminescent sheet(s) 102 on both sides. Some of the excitation light 112 scatters from the luminescent sheet 102 and exits the luminaire 100 at the bottom of the luminaire either directly or by reflection from the reflector 120. Emitted light 114 (for example, yellow light) created in the luminescent sheet can also exit the luminaire 100 at the bottom of the luminaire and can mix with the scattered excitation light 112.

FIG. 11 shows the excitation light 112 incident on the luminescent sheet 102 at a steep oblique angle, which in one embodiment maximizes the interaction of the excitation light with the luminescent sheet 102. The incident angle is a design variable which can be adjusted in the configuration of the luminaire 100 for maximum efficiency depending on the properties of the luminescent sheet 102. In general, the oblique angle varies from an angle of 15° to 85° to a normal to the luminescent sheet. In one embodiment of the invention, the luminescent sheet 102 is shown in a location separated from the reflector 120, allowing emitted light to reflect around the sheet. In general, the position of the luminescent sheet is set to a position for maximum efficiency. Efficiency in this context referring to the ratio of the amount of light produced by the luminaire (integrated over all directions, for example in an integrating sphere) to the power used to operate the luminaire.

Accordingly, in one or more embodiments of the invention, luminaire 100 includes a source of excitation light (for example, blue LEDs), a luminescent sheet (for example, one that converts blue light to yellow light), and a nanofiber reflector that directs the scattered light. Light can be directed from the excitation sources obliquely toward the luminescent sheet. The angle between the excitation source and the luminescent sheet is set to a value having the greatest efficiency. Efficiency in this context also referring to the ratio of the amount of light produced by the luminaire (integrated over all directions, for example in an integrating sphere) to the power used to operate the luminaire. The luminescent sheet 102 shown in FIG. 11 is located at a distance from the excitation source 110 and from the reflector 120. The reflector 120 is arranged to reflect light from the scattered and emitted light in a useful direction. While FIG. 11 shows a reflector 120 having two reflective nanofiber surfaces held at a right angle, in other embodiments, the reflector 120 can also be curved surface rather than planar surface, can include facets or surface features, and can be related by angles different from right angles.

In an alternative embodiment to that shown in FIG. 11, the excitation light source and luminescent sheets are replaced by a primary light source of desired spectral properties. Light emitted by the primary light source strikes the nanofiber reflector and is directed to the exist of the lighting device by the highly reflective nature of the nanofiber reflector.

Figure 12:
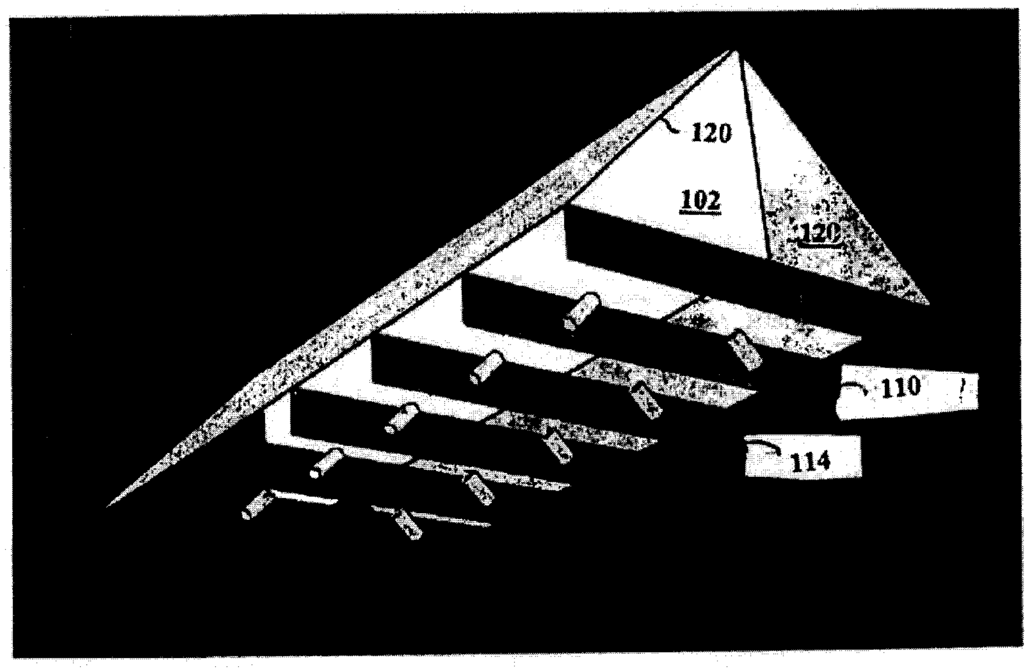
FIG. 12 is a perspective depiction of a similar luminaire structure according to one embodiment of the invention.

One example of another luminaire 150 according to the invention is shown in FIG. 12. In this luminaire, blue light (scattered from the luminescent sheet 102) and yellow light (emitted from the luminescent sheet) are mixed to form white-appearing light. For decorative purposes, the mix of luminescent particles can be altered to provide specific colors of illumination. The shape and size of the luminescent sheet 102 and the shapes and sizes of associated nanofiber reflectors can be altered to provide new design elements for decorative or architectural purposes. Luminescent sheets 102 of various kinds can be arranged to be easily substituted for each other, allowing color or shape to be changed conveniently and inexpensively by the user of the luminaire 100 or 150.

In an alternative embodiment to that shown in FIG. 12, the excitation light source and luminescent sheets are replaced by a primary light source of desired spectral properties. Light emitted by the primary light source strikes the nanofiber reflector and is directed to the exit of the lighting device by the highly reflective nature of the nanofiber reflector.

More specifically, FIG. 12 is a schematic depiction of luminaire 150 according to one embodiment of the invention. The view in FIG. 12 is from underneath the luminaire looking upward toward the planar nanofiber reflectors 120. Reflectors 120 can include the enhanced reflectance coatings of the invention described above. The vertical plane in the middle of luminaire 150 depicts luminescent sheet(s) 102 that converts a part of the excitation light from light sources 110 to secondary, emitted light. Cross-members 114 on the lower part of the luminaire 150 hold light sources 110 for producing the excitation light. The reflectors 120 (i.e., the nanofiber reflector substrates) direct light out the bottom of luminaire 150.

Figures 13A, 13B:
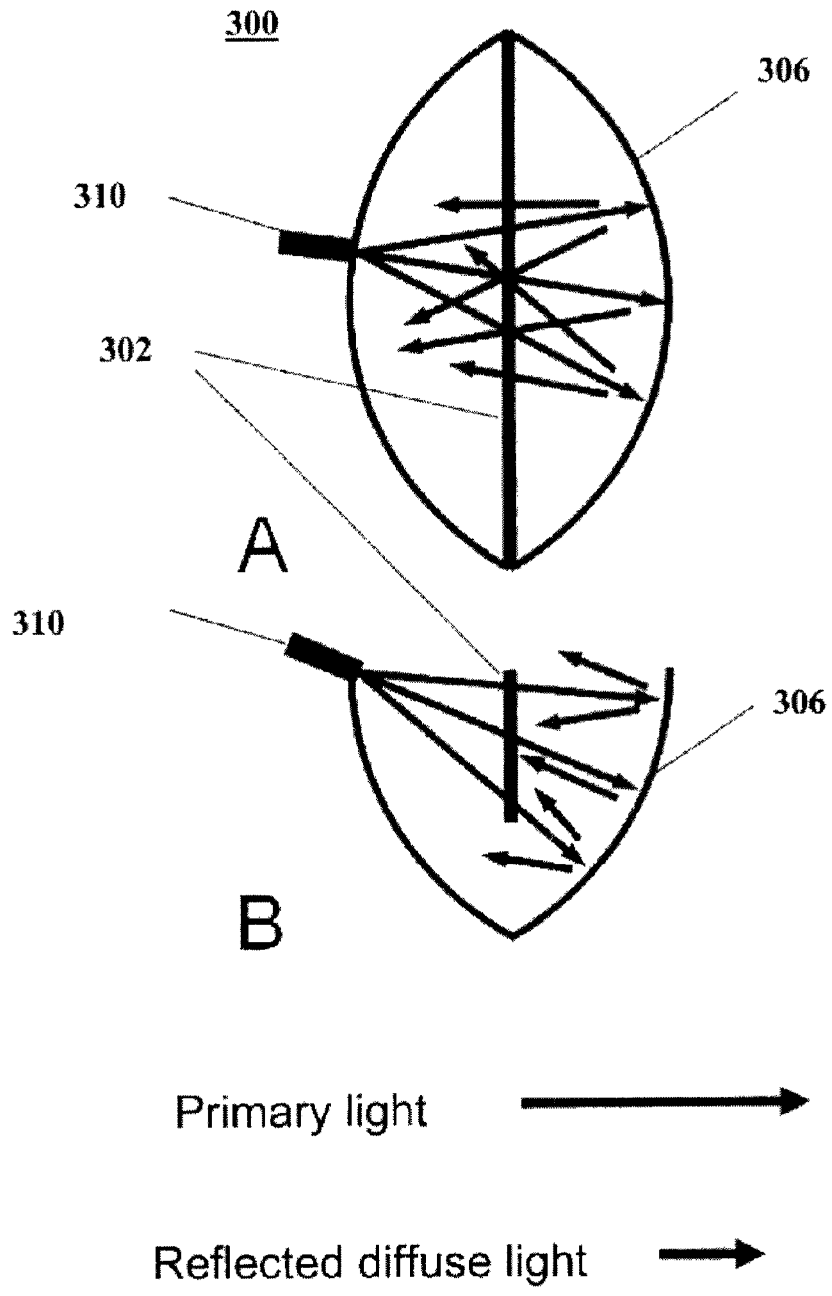
FIGS. 13A, 13B, 13C, and 13D are depictions of other light emitting structures according to one embodiment of the invention, from different perspective views.
Figures 13C, 13D:
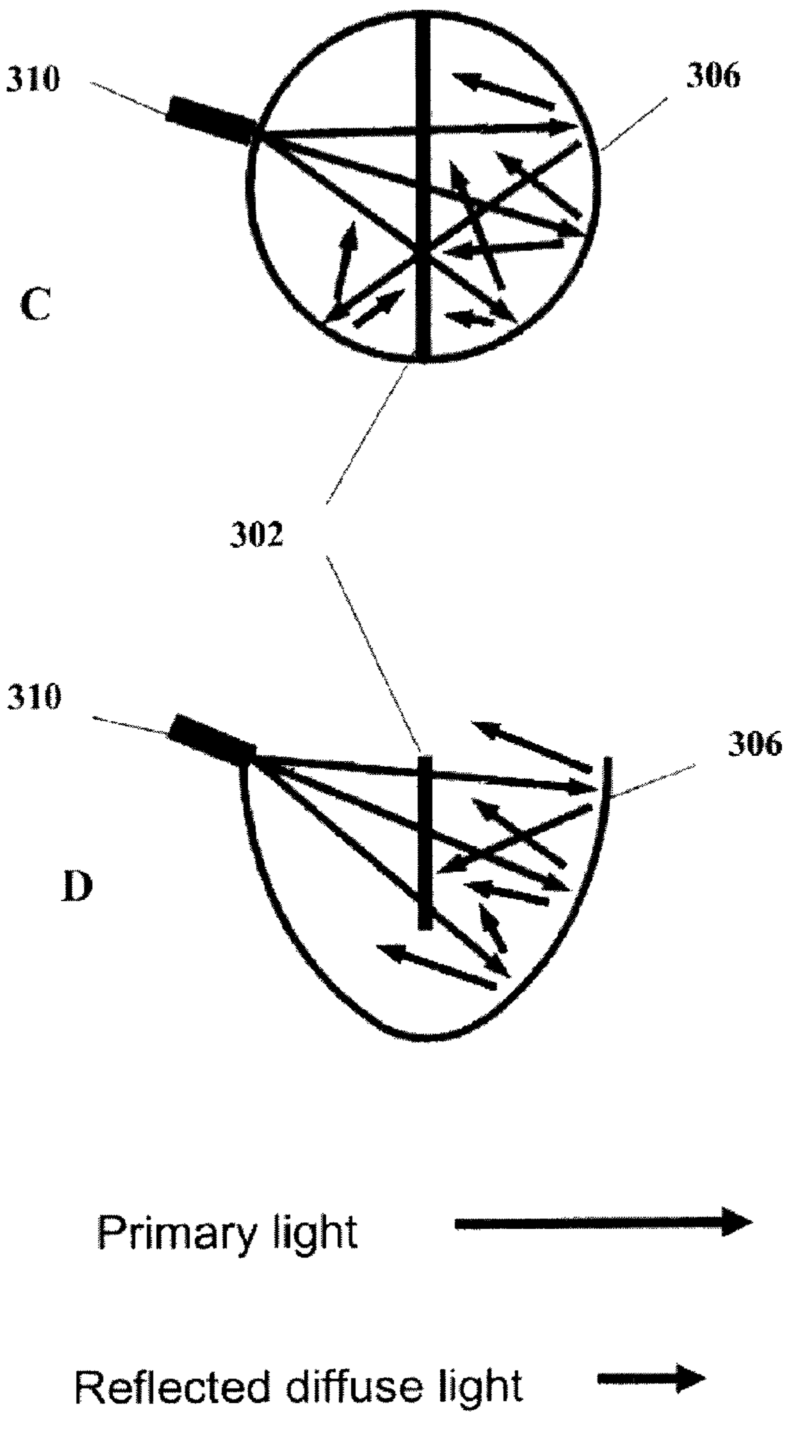

FIGS. 13A, 13B, 13C, and 13D are depictions of other light emitting structure 300 according to one embodiment of the invention, from different perspective views. FIG. 13A shows a top view of structure 300 whose outline includes segments of a full circle. A light source 310 such as for example an LED provides excitation illumination for the light-conversion material 302, located in this embodiment in the center of structure 300. Excitation light is transmitted through the light-conversion material 302 and reflected by the nanofiber reflector structure 306. Nanofiber reflector structure 306 can include the enhanced reflectance coatings of the invention described above. The nanofiber reflector could be used by itself (e.g., a formed sheet of nanofiber material) or laminated to a backing layer (e.g., metal, glass, paper such as PolyArt, etc.) to provide mechanical support. Unscattered excitation light is indicated by solid arrows. FIG. 13B is a side view of the structure 300, also showing an outline including segments of a circle. FIG. 13C is a top view of structure 300, showing the emission and scattering of light from the light-conversion material 302. Excitation light incident onto the luminescent sheet is not shown. Excitation light scattered from the matrix of the luminescent sheet without change of wavelength is indicated by solid arrows. Secondarily emitted light, having one or more wavelengths that are longer than that of the excitation light, is indicated by dashed arrows. While FIG. 13B illustrates unscattered excitation light, FIG. 13D illustrates scattered excitation light (indicated by solid arrows) and secondarily emitted light (dashed arrows). Depending on the composition of the luminescent material, the secondarily emitted light may have one wavelength or several wavelengths. In this part of structure 300, only light emitted from the right side of the light-conversion material 302 is shown, in order to illustrate more clearly the additional path for reflection of light underneath the light-conversion material 302.

In this embodiment, the outline of the top view of structure 300 is a full circle, and the light source 310 is not located at its center. In this configuration, some light is still scattered back toward the light-conversion material 302 and the opposite reflector surface 306. In the perpendicular plane (FIG. 13B), the light source 310 is in the center of the circle forming part of the side of structure 300, which is intended to optimize reflection back toward the light conversion material.

Figure 14:
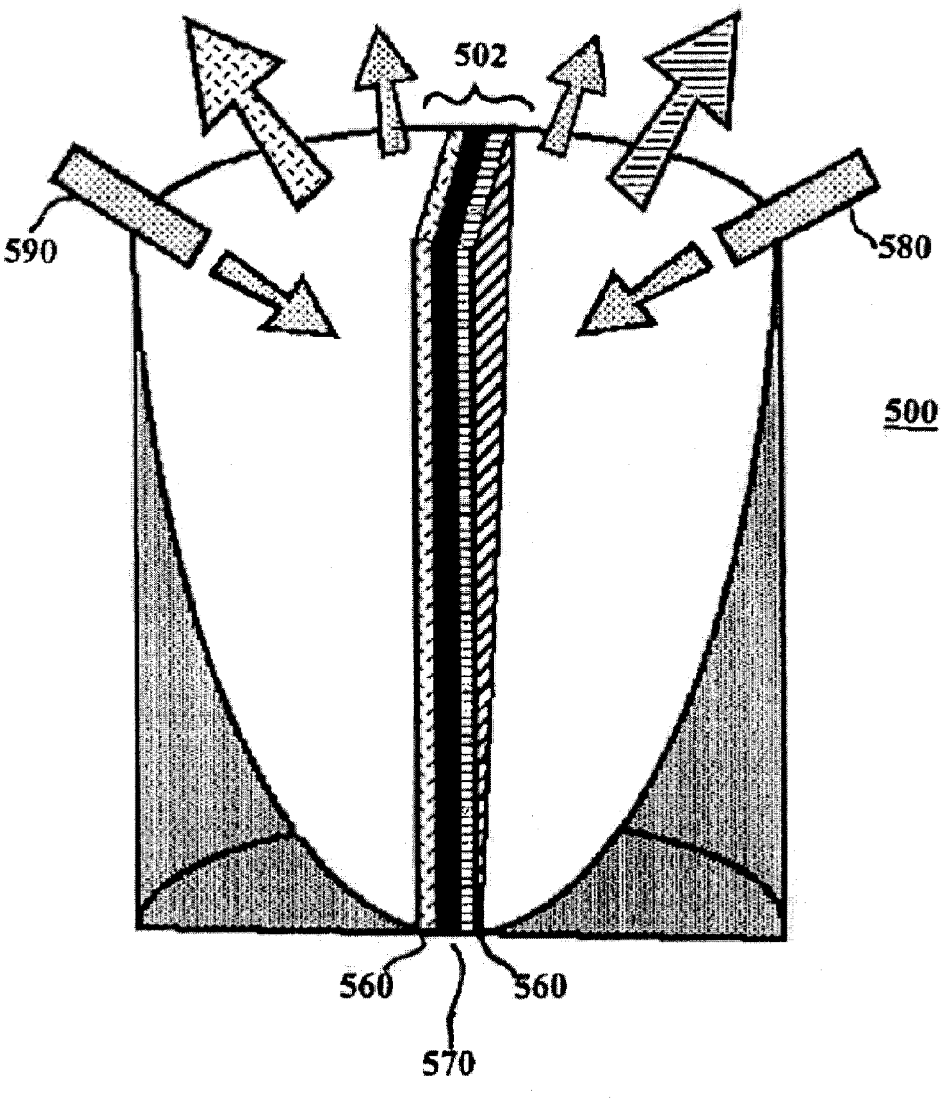
FIG. 14 is a depiction of another light emitting structure according to one embodiment of the invention.

Remote Phosphor Reflector Block:

A remote phosphor reflector block (RPRB) embodiment of the invention provides another mechanism for incorporating the light conversion materials discussed above. FIG. 14 is a depiction of a RPRB according to one embodiment of the invention.

In the RPRB embodiment, light-conversion material 502 is relatively thick or otherwise substantially diffusely reflective. Such a reflective conversion material does not permit substantial light to be transmitted through light-conversion material 502. Therefore, this material provides a mechanism to separate light of different colors in different compartments. Separation of colors of light is a benefit when mixed light converters are to be used. For example, light emitting structure 500 can include both a green converter layer 550 and a red converter layer 560 which both can interact with blue excitation light. Mixed converters 550, 560 (e.g., green and red) can be arranged to provide a wider color gamut or better color rendering quality than a single converter layer (such as for example a single yellow layer). In this regard, mixed converters can be advantageous. However, with mixed converters, it may happen that blue light is intercepted by a green converter, which emits green light, and the emitted green light can in turn be intercepted by a red converter which emits red light. Multiple conversions like this reduce the efficiency of light production. Efficiency in this context also referring to the ratio of the amount of light produced by the luminaire (integrated over all directions, for example in an integrating sphere) to the power used to operate the luminaire. It should be noted that, for the same power input to the structure 500, multiple conversions of light colors produce less total light than single conversions. To address this inefficiency, this embodiment of the invention segregates areas of different color conversion layers into different regions using reflective barriers 570. Reflective barriers 570 can include the enhanced reflectance coatings of the invention described above.

As before, for a balance of white light, illumination from the excitation light source should not directly escape the RPRB luminaire structure. Light escaping the luminaire structure should include excitation light scattered from the matrix of the light-conversion material without a change in wavelength (for example, blue light) combined with emitted light produced by the active luminescent particles that has a longer wavelength than the excitation light (for e.g., example, red and green light).

In the RPRB embodiment, a concave reflector made from reflective nanofibers holds an array of converting and reflective layers in a position parallel to the axis of the reflector. The converting layers (e.g., 550 and 560) are located in a position that divides the volume of the reflector into two volumes. The structure 500 includes two light sources (e.g., two LEDs or other light sources) to supply respectively excitation light (in this example, blue light) to the converting layers 550 and 560. The central layer in FIG. 14 is a plane reflector for example made of reflective nanofibers (or other suitable reflector of light). The color converting layer 550 in FIG. 16 can be for example a layer of photoluminescent nanofibers that produces green light, while color converting layer 560 can be a layer of photoluminescent nanofibers that produces red light.

More specifically, in the configuration of FIG. 14, green and red photoluminescent nanofiber sheets (PLNs) 550 and 560 are placed back to back and separated by a reflecting layer 570 such as aluminum foil or an aluminum thin film. Each PLN is pumped by its own short wavelength LED 580, 590 such as those emitting wavelengths such as 410, 450, 460 or 470 nm. Light output from each LED can be adjusted by altering the LED driving voltage. The pump light and the red and green lights are not configured to mix until exiting the reflector 500.

By combining blue light from the emission source (i.e., the primary light) and emissions from red to green PLNs (i.e., the secondary light), white light is produced. Such white light can be used as is or optically mixed to eliminate any vestiges of the separate R, G, or B lights by using devices such as an integrating sphere or high transmittance diffuser polymeric film such as those available from Brightview Technologies. Alternatively, the diffuse reflection properties of the reflective nanofiber material serve to optically mix the separate R, G, B light. This is an important advantage of the nanofiber reflector material which optically mixes the separate R, G, B lights to produce white light emanating from the structure.

In the various embodiments described above, the light sources can be LEDs used to excite the PLNs (or color conversion layers) which may emit one primary wavelength or emit different primary wavelengths. For example, one LED could emit at 460 nm and the second could emit at 410 nm.

One advantage of the nanofiber base of the PLNs is that it represents a diffuse Lambertian reflector under certain circumstances. Thus, light incident on a diffuse reflecting nanofiber will not be specularly reflected but rather will be scattered at all angles with a cosine θ dependence with respect to the surface normal (i.e., following Lambert's emission law).

An alternative to having separate green and red PLNs, each pumped by a blue light, is to have a green PLN excited by a blue LED and in the second compartment have a red LED impinging on an undoped nanofiber substrate. This design could still be configured to emit blue, green and red light in the proper proportionality to generate white light, and the reflective layer may not be required. This approach represents a solution to the so-called "green gap" of low performing LEDs. Alternatively, green or red phosphors could be used in place of quantum dots. Alternatively, blue and red LEDs could be aimed at a green PLN to produce white light. Multiple blue or red LEDs can be added to the reflector block to impart greater control over the light produced.

In addition to the embodiments listed above, there are several additional embodiments of this invention. These embodiments include:

1) Incorporation of an optically clear encapsulant such as an epoxy or a silicone-based encapsulant available from suppliers such as General Electric or Dow Corning in at least a portion of the RPRB structure. Such encapsulants may or may not contain luminescent particles. With this embodiment, the index of refraction of these encapsulants is chosen to enhance the reflectance of the nanofiber reflector especially with regard to reflection at longer wavelengths by using the enhanced reflectance coatings of the invention.
2. In addition, the reflector block can be made out of reflective materials including but not limited to stamped metal, metallized plastics, and metallized glass. Reflective nanofiber substrates can be attached to these structures through adhesives to provide for high reflectance as described above.
3. The RPRB can be incorporated into a larger structure to create other lighting devices such as lamps or luminaires. For example, the RPRB could be formed in the base of a glass "Edison" bulb where a portion of the glass walls may be metallized to provide some of the functionality of the reflector block. In this embodiment, the frosted coating on the "Edison" bulb would be used as a means of mixing the red, green, and blue colors to produce white light. The electrical drivers for the RPRB "Edison" bulb could be contained in the Edisonian socket in much the same way that the ballast for compact fluorescent lights is contained at the base of the bulb.
4. In addition to incorporating luminescent nanoparticles into the PLNs as described above, other luminescent materials and phosphors can be incorporated into the PLNs. One example includes the incorporation of green phosphors such as the sulfoselenide compositions sold by PhosphorTech or doped silicates sold by Intematix, as discussed above.
5. Additional optical elements such as low-pass optical filters can be added at the input port of the light source to prevent loss of the secondary emission from the photoluminescent nanofiber.

Presently, the RPRB embodiment has yielded the following color rendering indexes (CRI) and correlated color temperatures (CCT). By comparison, measured values for commercial white LEDs have a range of CCT values depending upon the color of the lamp. "Cool white" lamps have CCTS between 5,000 K and 10,000K, "neutral white" lamps have CCTs between 3,700 K and 5,000 K, and "warm white" lamps have CCTs between 2,600 K and 3,700 K. The typical CRI of these lamps is approximately 83. Higher CCTs correspond to a bluish appearance of the light source whereas lower CCTs correspond to a more reddish appearance. CRI refers to the ability to reproduce colors accurately and values above 80 are acceptable for general illumination.

In one embodiment of this invention, the fiber-based nanocomposite reflector can be used in conjunction with a liquid crystal display (LCD) or similar display device used in televisions, computers, cellular phones, or other mobile electronics. Often, LCDs will contain an optical cavity that provides lighting to aid in viewing the display, as described in U.S. Pat. No. 7,660,040. A lamp to improve the visual appearance of the display can be either located within the optical cavity and behind the LCD (i.e., backlight) or introduced from the side of the display (i.e., edge lit). The brightness of the display will depend on the fraction of the light emitted from this lamp that ultimately travels through the display and is seen by the user. Lining the display optical cavity with the reflective nanofiber composite of the current invention will increase the light output from the display due to its high reflectance.

Numerous modifications and variations of the invention are possible in light of the above teachings. It is therefore to be understood that within the scope of the appended claims, the invention may be practiced otherwise than as specifically described herein.

The invention claimed is:

1. A fiber-based reflective lighting device comprising:

a source configured to generate a primary light;

a substrate having a nanocomposite mat of reflective fibers having diameters less than 1,000 nm which diffusively reflects visible light upon illumination with at least the primary light;

said nanocomposite mat including a reflectance-enhancing coating conformally disposed around an outer surface of the fibers, having a refractive index different from the reflective fibers, and which increases a reflectance of the substrate in the visible spectrum; and a light exit configured to emanate the reflected light.

2. The device of claim 1, wherein the coating comprises bridge elements connected between the reflective fibers and forming light scattering sites between adjacent fibers, or the coating comprises nodules or segments on the reflective fibers forming light scattering sites on the fibers.

3. The device of claim 1, wherein the reflectance-enhancing coating comprises an optically clear coating.

4. The device of claim 1, wherein the reflectance-enhancing coating comprises at least one of parylene coatings, perfluorosilane coatings, vacuum plasma coatings, atomic layer deposition coatings, perfluorinated coatings, phosphonate dip coatings, and silicone coatings, or mixtures thereof.

5. The device of claim 1, wherein the reflectance-enhancing coating comprises a coating having a thickness of at least one of less than 50 nm, less than 200 nm, less than 2000 nm, or less than 5,000 nm.

6. The device of claim 1, wherein a difference in refractive indices of the reflective fibers and the coating is less than 0.20 or less than 0.12.

7. The device of claim 1, wherein the reflective fibers include at least one of Al, Au, Ag, $TiO_2$, ZnO, $BaSO_4$, and Zn.

8. The device of claim 1, wherein the mat of reflective fibers comprises a reflective material having a reflectivity greater than 0.8.

9. The device of claim 8, wherein the reflective material comprises at least one nanofiber having a laterally extending surface for reflection of the light.

10. The device of claim 9, wherein the reflective material produces a mix of specular and diffuse reflection of light.

11. The device of claim 1, wherein the reflective fibers comprise polymer fibers.

12. The device of claim 11, wherein the polymer fibers comprise at least one of poly(dimethyl siloxane), poly(vinylidene fluoride), poly(ethylene oxide), poly(methyl methacrylate), poly(propylene), poly(vinyl alcohol), poly(ethylene), nylon 6, nylon 6,10, nylon 6,6, polycarbonate, polyamide, polysulfone, and polyethylene terephthlate, or combinations thereof.

13. The device of claim 1, wherein the source configured to generate said primary light comprises a light emitting diode.

14. The device of claim 1, wherein the reflective nanocomposite mat comprises fibers having an average fiber diameter in a range between 50 to 5,000 nm.

15. The device of claim 1, wherein the reflective nanocomposite mat comprises fibers having an average fiber diameter in a range between 50 to 350 nm before application of the reflectance-enhancing coating.

16. The device of claim 1, wherein the reflective nanocomposite mat has a thickness in a range between 0.01 microns and 2,000 microns or between 1 to 500 microns.

17. The device of claim 1, wherein the reflective nanocomposite mat reflects at least 70% of all visible light from 420 nm to 720 nm.

18. The device of claim 1, wherein the reflective nanocomposite mat reflects at least 80% of all visible light from 420 nm to 720 nm.

19. The device of claim 1, wherein the reflective nanocomposite mat reflects at least 90% of all visible light from 420 nm to 720 nm.

20. A lighting device insert comprising:

a substrate having a nanocomposite mat of reflective fibers having diameters less than 1,000 nm which diffusively reflects visible light upon illumination with at least a primary light;

said nanocomposite mat including an reflectance-enhancing coating having a refractive index different from the reflective fibers and which increases a reflectance of the substrate in the visible spectrum; and said nanocomposite mat configured to diffusively reflect at least 70% of incident light.

21. The insert of claim 20, wherein the reflectance-enhancing coating comprises a coating having a thickness of at least one of less than 20 nm, less than 200 nm, less than 2000 nm, or less than 5,000 nm.

22. The insert of claim 20, wherein a difference in refractive indices of the reflective fibers and the coating is less than 0.20 or less than 0.12.

23. The insert of claim 20, wherein the coating comprises bridge elements connected between the reflective fibers and forming light scattering sites between adjacent fibers.

24. The insert of claim 20, wherein the coating comprises nodules or segments on the reflective fibers forming light scattering sites on the fibers.

25. The insert of claim 20, wherein the reflective fibers include at least one of Al, Au, Ag, $TiO_2$, ZnO, $BaSO_4$, and Zn.

26. The insert of claim 20, wherein the reflective fibers comprises a reflective material having at least one nanofiber having a laterally extending surface for reflection of the light.

27. The insert of claim 26, wherein the reflective material produces a mix of specular and diffuse reflection of light.

28. The insert of claim 20, wherein the reflectance-enhancing coating comprises at least one of parylene coatings, perfluorosilane coatings, vacuum plasma coatings, atomic layer deposition coatings, perfluorinated coatings, phosphonate dip coatings, and silicone coatings, or mixtures thereof.

29. A method for making a reflective material, comprising:

providing a nanocomposite mat of reflective fibers having diameters less than 1,000 nm which diffusively reflects visible light; and conformally applying an reflectance-enhancing coating of a thickness between 20 nm and 5,000 nm around an outer surface of the fibers, wherein a difference in refractive indices between the fibers and the coating is less than 0.20.

30. The method of claim 29, wherein the applying comprises applying said coating with a difference in refractive indices between the fibers and the coating which is less than 0.15.

31. The method of claim 29, wherein the applying comprises applying said coating with at least one of vapor deposition, plasma coating, dip-coating, spray coating, roller coating, extrusion coating, dip coating, inkjet printing, nanoimprint lithography, transfer coating, and dip-pen lithography.

32. The method of claim 29, wherein the applying comprises applying for said coating at least one of parylene coatings, perfluorosilane coatings, vacuum plasma coatings, atomic layer deposition coatings, perfluorinated coatings, phosphonate dip coatings, and silicone coatings, or mixtures thereof.

33. The method of claim 29, wherein the applying comprises applying for said coating a coating having a thickness of at least one of less than 20 nm, less than 200 nm, less than 2000 nm, or less than 5,000 nm.

* * * * *